US008829099B2

(12) United States Patent
Kumazawa et al.

(10) Patent No.: US 8,829,099 B2
(45) Date of Patent: Sep. 9, 2014

(54) RESIN COMPOSITION AND MOLDED ARTICLE COMPOSED OF THE SAME

(75) Inventors: Sadanori Kumazawa, Nagoya (JP); Yuki Amano, Anjyo (JP); Hiroyuki Ohme, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 103 days.

(21) Appl. No.: 11/988,414

(22) PCT Filed: Jan. 27, 2006

(86) PCT No.: PCT/JP2006/301285
§ 371 (c)(1),
(2), (4) Date: Jan. 7, 2008

(87) PCT Pub. No.: WO2007/007435
PCT Pub. Date: Jan. 18, 2007

(65) Prior Publication Data
US 2009/0030132 A1    Jan. 29, 2009

(30) Foreign Application Priority Data

Jul. 8, 2005  (JP) ................................. 2005-199985
Sep. 30, 2005 (JP) ................................. 2005-286529

(51) Int. Cl.
| C08K 3/34 | (2006.01) |
| C08L 67/04 | (2006.01) |
| C08L 51/10 | (2006.01) |
| C08L 51/04 | (2006.01) |
| C08F 285/00 | (2006.01) |
| C08F 289/00 | (2006.01) |
| C08L 51/08 | (2006.01) |
| C08L 33/10 | (2006.01) |
| C08L 51/00 | (2006.01) |

(52) U.S. Cl.
CPC ............... *C08L 51/003* (2013.01); *C08L 67/04* (2013.01); *C08L 51/00* (2013.01); *C08L 51/10* (2013.01); *C08L 51/04* (2013.01); *C08L 2205/02* (2013.01); *C08F 285/00* (2013.01); *C08F 289/00* (2013.01); *C08L 51/08* (2013.01); *C08L 33/10* (2013.01); *C08L 51/085* (2013.01)
USPC ........... 524/493; 523/200; 523/201; 524/492; 524/494; 524/502; 524/522; 524/523

(58) Field of Classification Search
USPC .......... 523/200, 201; 524/492, 493, 494, 522, 524/523, 502
See application file for complete search history.

(56) References Cited

U.S. PATENT DOCUMENTS

| 5,300,576 A | 4/1994 | Nemphos et al. |
| 6,730,378 B2 * | 5/2004 | Matsuoka et al. ........... 428/35.7 |
| 7,271,212 B2 * | 9/2007 | Oguni et al. .................. 524/442 |
| 7,589,151 B2 | 9/2009 | Aoki et al. |
| 2005/0143502 A1 * | 6/2005 | Yamada et al. ............... 524/115 |
| 2008/0071038 A1 | 3/2008 | Ido |
| 2009/0018237 A1 | 1/2009 | Fuji et al. |

FOREIGN PATENT DOCUMENTS

| CN | 101142282 A | 3/2008 | |
| JP | 6-287398 A | 10/1994 | |
| JP | 8-59949 A | 3/1996 | |
| JP | 10-158369 A | 6/1998 | |
| JP | 11-228611 A | 8/1999 | |
| JP | 2001-335626 A | 12/2001 | |
| JP | 2002-155207 A | 5/2002 | |
| JP | 2003-26891 A | 1/2003 | |
| JP | 2003-171536 A | 6/2003 | |
| JP | 2003-253107 A | 9/2003 | |
| JP | 2003-286396 A | 10/2003 | |
| JP | 2004-269588 A | 9/2004 | |
| JP | 2004-269720 A | 9/2004 | |
| JP | 2004-323758 A | 11/2004 | |
| JP | 2005-171204 A | 6/2005 | |
| JP | 2005171204 A * | 6/2005 | ............. C08L 33/12 |
| WO | WO-2004/087812 A1 | 10/2004 | |
| WO | WO 2005/085352 A1 | 9/2005 | |
| WO | WO 2005/123831 A1 | 12/2005 | |

OTHER PUBLICATIONS

Extended European Search Report for European Application No. 06712451.1 dated Jul. 4, 2013.
Extended European Search Report, dated May 9, 2014, for European Application No. 14152245.8.

* cited by examiner

*Primary Examiner* — David W Wu
*Assistant Examiner* — Marie Reddick
(74) *Attorney, Agent, or Firm* — Birch, Stewart, Kolasch & Birch, LLP

(57) ABSTRACT

A resin composition comprising a polylactic acid-based resin (A) and methacrylic resins (B), wherein the methacrylic resins having at least (a) a difference of 10° C. or more in glass transition temperature or (b) a difference of 3% or more in syndiotacticity; it is preferred that at least one of the methacrylic resins (B) is a methacrylic resin having a weight average molecular weight of 50,000 to 450,000, a glass transition temperature of 110° C. or higher and a syndiotacticity of 40% or more, and that the resin composition further contains a multilayer structure polymer formed as particles each consisting of a core layer and one or more shell layers covering it (C). A molded article made of said resin composition.

23 Claims, No Drawings

RESIN COMPOSITION AND MOLDED ARTICLE COMPOSED OF THE SAME

TECHNICAL FIELD

The present invention relates to a resin composition and a molded article made thereof. In more detail, this invention relates to a resin composition containing a polylactic acid-based resin, which is excellent in transparency, heat resistance and flowability and, in a preferred mode, also excellent in impact resistance and hydrolysis resistance, and further relates to a molded article made thereof.

BACKGROUND ART

In recent years in view of the preservation of global environment, biodegradable polymers that can be degraded in natural environment thanks to the actions of the microbes existing in the earth and water attract attention, and various biodegradable polymers are developed. Among them, for example, polyhydroxy butyrate, polycaprolactone, aliphatic polyesters obtained from an aliphatic dicarboxylic acid such as succinic acid or adipic acid and a glycol such as ethylene glycol or butanediol, polylactic acid resin, etc. are well known as biodegradable polymers that can be melt-molded. Among them, polylactic acid resin is expected as a melt-moldable biopolymer for such reasons that lactic acid as the monomer can be produced at a low cost using biomass such as corn as the raw material by a fermentation method using a microbe and that the polylactic acid resin is transparent and has a melting point as high as about 170° C.

However, since the glass transition temperature of polylactic acid resin is about 60° C., the resin is likely to be thermally deformed or declines greatly in stiffness at about this temperature. So, it has such a problem that in the case where it is used as various molded articles, it is likely to be thermally deformed and is difficult to use under ordinary conditions of use. A polylactic acid-based material with excellent heat resistance is being demanded.

Further, in the case where an injection molded article is produced, it is important that the resin has excellent flowability in view of moldability in the injection molding step. So, a polylactic acid-based material excellent in all of transparency, heat resistance and flowability is being demanded.

Furthermore, polylactic acid resin has a further other problem that since it is fragile and low in impact resistance, various molded articles produced by using the resin are likely to be cracked or broken in any other way and are difficult to use. So, a polylactic acid-based material with excellent impact resistance is being demanded.

Patent document 1 relates to a resin composition consisting of polylactic acid and an acrylate polymer, and describes that a resin composition with excellent heat resistance can be obtained. However, the document does not disclose anything about sustaining the transparency of polylactic acid at all, and even the examples of the document do not refer to the transparency or flowability, though they refer to higher heat resistance. The document does not suggest a solving means for obtaining a resin composition excellent in all of transparency, heat resistance and flowability at all.

Patent document 2 relates to a resin composition consisting of any of α-hydroxycarboxylic acid polymers including polylactic acid and a poly(meth)acrylate, and describes that a resin composition with excellent hydrolyzability can be obtained. Patent document 3 relates to a resin composition consisting of polylactic acid and an acrylic compound, and describes that a resin composition with excellent moldability can be obtained. However, neither of the documents discloses heat resistance or flowability at all, and suggests a solving means for obtaining a resin composition excellent in all of transparency, heat resistance and flowability at all.

Patent document 4 relates to a resin composition consisting of a polylactic acid-based polymer and an acrylic polymer and describes that a resin composition excellent in both transparency and heat resistance can be obtained. Patent document 5 relates to a resin composition consisting of polylactic acid and a poly (meth)acrylate and describes that a biaxially oriented film formed of a resin composition excellent in both transparency and heat resistance can be obtained. Patent document 6 relates to a resin composition consisting of polylactic acid and polymethyl methacrylate and describes that a resin composition excellent in both transparency and heat resistance can be obtained. Non-patent documents 1 and 2 respectively describe that if polylactic acid and polymethyl methacrylate are mixed, the glass transition temperature can be enhanced. However, the non-patent documents do not disclose anything about flowability at all and the techniques described in these documents are not sufficient in the effect of enhancing heat resistance. That is, higher heat resistance is necessary. These documents do not suggest a solving means for obtaining a resin composition excellent in all of transparency, heat resistance and flowability at all.

Patent document 7 describes that a resin composition consisting of a (meth)acrylic acid ester-based polymer and a rubbery polymer can provide a resin composition excellent in all of transparency, heat resistance and impact resistance. However, the document does not disclose the mixing of a polylactic acid-based resin at all, and does not suggest at all a solving means for providing a resin composition containing a polylactic acid-based resin, which is excellent in all of transparency, heat resistance, flowability and impact resistance.

[Patent document 1] U.S. Pat. No. 5,300,576 (pages 1-2)
[Patent document 2] JP8-59949A (pages 1 to 2)
[Patent document 3] JP2002-155207A (pages 1 to 2)
[Patent document 4] JP2004-269720A (pages 1 to 2)
[Patent document 5] WO2004/87812 (pages 1 to 3)
[Patent document 6] JP2005-171204A (pages 1 to 2)
[Patent document 7] JP2003-26891A (pages 1 to 2)
[Non-patent document 1] Polymer Preprints Japan, 42 (3), 1180 (1993)
[Non-patent document 2] Polymer, 39 (26), 6891 (1998)

DISCLOSURE OF THE INVENTION

Problem to be Solved by the Invention

This invention addresses the problem of providing a resin composition containing a polylactic acid-based resin, which is excellent in transparency, heat resistance and flowability and, in a preferred mode, also excellent in impact resistance and hydrolysis resistance, and further providing a molded article made thereof.

Means for Solving the Problem

This invention employs the following means for solving the problem.

This invention is:

(1) A resin composition comprising (A) a polylactic acid-based resin and (B) methacrylic resins, wherein the methacrylic resins (B) include two or more methacrylic resins satisfying at least one of the following conditions:
(a) The difference in glass transition temperature is 10° C. or more.
(b) The difference in syndiotacticity is 3% or more.

(2) The resin composition, according to (1), wherein at least one of the methacrylic resins (B) is a methacrylic resin with a weight average molecular weight of 50,000 to 450,000, a glass transition temperature of 110° C. or higher and a syndiotacticity of 40% or more.
(3) The resin composition, according to (1), wherein (C) a multilayer structure polymer formed as particles each consisting of a core layer and at least one or more shell layers covering it is further comprised.
(4) The resin composition, according to (3), wherein the multilayer structure polymer formed as particles each consisting of a core layer and one or more shell layers covering it (C) satisfies at least one of the following conditions:
(c) The polymer has a refractive index of 1.45 to 1.50.
(d) The polymer contains a component with a glass transition temperature of 30° C. or lower.
(5) The resin composition, according to (3), wherein the outermost layer of the multilayer structure polymer formed as particles each consisting of a core layer and one or more shell layers covering it (C) is formed of a polymer containing methyl methacrylate units and/or methyl acrylate units.
(6) The resin composition, according to (3), wherein the dispersed particle size of the multilayer structure polymer formed as particles each consisting of a core layer and one or more shell layers covering it (C) in the resin composition is 1 to 1,000 nm.
(7) The resin composition, according to (3), wherein the ratio (1/m) of the number of agglomerated particles (1) to the number of non-agglomerated particles (m) of the multilayer structure polymer formed as particles each consisting of a core layer and one or more shell layers covering it (C) in the resin composition is 0 to 0.5.
(8) The resin composition, according to (1), wherein further a reactive compound containing at least one type of functional groups selected from glycidyl groups, acid anhydride groups, carbodiimide groups and oxazoline groups is mixed as a reactive compound (D).
(9) The resin composition, according to (8), wherein the reactive compound (D) is a polymer having a weight average molecular weight of 1,000 to 300,000 and containing glycidyl group-containing vinyl units.
(10) The resin composition, according to (1), wherein further inorganic particles (E) are comprised, the length of the minor axes of the inorganic particles in the resin composition being 1 to 300 nm, and the length of the major axes being 1 to 1,000 nm.
(11) The resin composition, according to (10), wherein the inorganic particles (E) contain silicon.
(12) The resin composition comprising (A) a polylactic acid-based resin and (B) a methacrylic resin, wherein the ratio (syndiotacticity/isotacticity) of the syndiotacticity to the isotacticity of the methacrylic resins (B) in the resin composition is 3.0 to 8.0.
(13) A molded article made of the resin composition as set forth in any one of (1) through (12).

Effect of the Invention

This invention can provide a resin composition containing a polylactic acid-based resin, which is excellent in transparency, heat resistance and flowability and, in a preferred mode, also excellent in impact resistance and hydrolysis resistance, and further can provide a molded article made thereof.

The Best Modes for Carrying Out the Invention

The polylactic acid-based resin (A) used in this invention is a polymer with L-lactic acid and/or D-lactic acid as a main component, but can also contain other copolymer components than lactic acid. Examples of the other copolymer component units include polycarboxylic acids, polyhydric alcohols, hydroxycarboxylic acids, lactones, etc., more particularly, polycarboxylic acids such as oxalic acid, malonic acid, succinic acid, glutaric acid, adipic acid, azelaic acid, sebacic acid, dodecanedioic acid, fumaric acid, cyclohexanedicarboxylic acid, terephthalic acid, isophthalic acid, phthalic acid, 2,6-naphthalenedicarboxylic acid, anthracenedicarboxylic acid, 5-sodiumsulfoisophthalic acid and 5-tetrabutylphosphoniumsulfoisophthalic acid, ethylene glycol, propylene glycol, butanediol, heptanediol, hexanediol, octanediol, nonanediol, decanediol, 1,4-cyclohexanedimethanol, neopentyl glycol, glycerol, pentaerythritol, bisphenol A and aromatic polyhydric alcohols obtained by adding ethylene oxide by reaction to bisphenol, polyhydric alcohols such as diethylene glycol, triethylene glycol, polyethylene glycol, polypropylene glycol and polytetramethylene glycol, hydroxycarboxylic acids such as glycolic acid, 3-hydroxybutyric acid, 4-hydroxybutyric acid, 4-hydroxyvaleric acid, 6-hydroxycaproic acid and hydroxybenzoic acid, lactones such as glycollide, ε-caprolactone glycollide, ε-caprolactone, β-propiolactone, δ-butyrolactone, β- or γ-butyrolactone, pivalolactone and δ-valerolactone, etc.

In this invention, it is preferred to use polylactic acid high in the optical purity of the lactic acid component in view of heat resistance. That is, it is preferred that the entire lactic acid component of the polylactic acid-based resin (A) contains 80% or more of L-isomer or 80% or more of D-isomer. It is more preferred that the entire lactic acid component contains 90% or more of L-isomer or 90% or more of D-isomer. An L-isomer content of 95% or more or a D-isomer content of 95% or more is especially preferred, and an L-isomer content of 98% or more or a D-isomer content of 98% or more is most preferred. Further, the upper limit of L-isomer content or D-isomer content is usually 100% or less.

The molecular weight and the molecular weight distribution of the polylactic acid-based resin (A) is not especially limited, if molding can be substantially performed. However, in view of heat resistance, it is preferred that the weight average molecular weight is 10,000 or more. More preferred is 40,000 or more, and further more preferred is 80,000 or more. Especially preferred is 100,000 or more, and most preferred is 130,000 or more. The upper limit is not especially limited, but in view of flowability, 500,000 or less is preferred. More preferred is 300,000 or less, and further more preferred is 250,000 or less. Especially preferred is 200,000 or less. The weight average molecular weight in this specification refers to the weight average molecular weight as polymethyl methacrylate (PMMA) measured by gel permeation chromatography (GPC) using hexafluoroisopropanol as the solvent.

The melting point of the polylactic acid-based resin (A) is not especially limited, but a melting point of 120° C. or higher is preferred, and 150° C. or higher is more preferred. The melting point in this specification refers to the peak top temperature of the endothermic peak measured by a differential scanning calorimeter (DSC).

As the method for producing the polylactic acid-based resin (A), a publicly known polymerization method can be used. A direct polymerization method from lactic acid, a ring-opening polymerization method through lactide formation, etc. can be used.

In this invention, each of the methacrylic resins is required to contain methyl methacrylate units as a main component, preferably to contain 70% or more of methyl methacrylate units. A copolymer containing 30% or less of the other vinyl-based monomer units is preferred. A copolymer containing 20% or less of the other vinyl-based monomer units is more preferred. Examples of the other vinyl-based monomers include aromatic vinyl-based monomers such as α-methylstyrene, o-methylstyrene, p-methylstyrene, o-ethylstyrene, p-ethylstyrene and p-t-butylstyrene, vinyl cyanide-based monomers such as acrylonitrile, methacrylonitrile and ethacrylonitrile, glycidyl itaconate, allyl glycidyl ether, styrene-p-glycidyl ether, p-glycidyl styrene, maleic anhydride, maleic acid monoethyl ester, itaconic acid, itaconic anhydride, glutaric anhydride, N-substituted maleimides such as N-methylmaleimide, N-ethylmaleimide, N-cyclohexylmaleimide and N-phenylmaleimide, acrylamide, methacrylamide, N-methylacrylamide, butoxymethylacrylamide, N-propylmethacrylamide, acrylic acid, methyl acrylate, ethyl acrylate, butyl acrylate, cyclohexyl acrylate, aminoethyl acrylate, propylaminoethyl acrylate, 2-hydroxyethyl acrylate, 2-hydroxypropyl acrylate, glycidyl acrylate, dicyclopentenyloxyethyl acrylate, dicyclopentanyl acrylate, butanediol diacrylate, nonanediol diacrylate, polyethylene glycol diacrylate, methyl 2-(hydroxymethyl)acrylate, ethyl 2-(hydroxymethyl) acrylate, methacrylic acid, ethyl methacrylate, butyl methacrylate, cyclohexylmethacrylate, dimethylaminoethylmethacrylate, ethylaminopropyl methacrylate, phenylaminoethyl methacrylate, cyclohexylaminoethyl methacrylate, 2-hydroethyl methacrylate, 2-hydroxypropyl methacrylate, glycidyl methacrylate, dicyclopentenyloxyethyl methacrylate, dicyclopentanyl methacrylate, pentamethylpiperidyl methacrylate, tetramethylpiperidyl methacrylate, benzyl methacrylate, ethylene glycol dimethacrylate, propylene glycol dimethacrylate, polyethyleneglycoldimethacrylate, N-vinyldiethylamine, N-acetylvinylamine, allylamine, methallylamine, N-methylallylamine, p-aminostyrene, 2-isopropenyl-oxazoline, 2-vinyl-oxazoline, 2-acroyl-oxazolien, 2-styryl-oxazoline, etc. Any one of these vinyl-based monomers can be used alone, or two or more of them can also be used together. Further, in view of heat resistance, low hygroscopicity and surface hardness, a copolymer containing ring structure units such as lactone ring, maleic anhydride or glutaric anhydride in the main chain is preferred. Furthermore, in the case where a copolymer containing a ring structure in the main chain is used, it is more preferred to use a methacrylic resin not containing a ring structure together.

The methacrylic resins (B) used in this invention include two or more methacrylic resins satisfying at least one of the following conditions.
(a) The difference in glass transition temperature is 10° C. or more.
(b) The difference in syndiotacticity is 3% or more.

If methacrylic resins satisfying these conditions are used, the intermolecular interaction with the polylactic acid-based resin increases to enhance affinity. So, the effect of enhancing heat resistance becomes large, and a resin composition excellent in transparency, heat resistance and flowability can be obtained.

In this invention, in view of heat resistance and flowability, it is preferred that the difference in glass transition temperature is 15° C. or more. More preferred is 20° C. or more. If the difference in glass transition temperature is less than 10° C., the effect of enhancing heat resistance is insufficient. Further, though the upper limit of the difference in glass transition temperature is not limited, 60° C. or less is preferred in view of transparency. The glass transition temperature in this specification refers to the value measured according to the method described in JIS K 7121, being the half point glass transition temperature measured by DSC at a heating rate of 20° C./min.

In this invention, in view of heat resistance and flowability, it is preferred that the difference in syndiotacticity is 5% or more. More preferred is 7% or more, and further more preferred is 10% or more. If the difference in syndiotacticity is less than 3%, the effect of enhancing heat resistance is insufficient. Further, the upper limit of the difference in syndiotacticity is not especially limited, but in view of transparency, 50% or less is preferred. The syndiotacticity in this specification can be calculated as described below. The integrated intensities of the peaks of the backbone methyl groups at 0.9 ppm, 1.0 ppm and 1.2 ppm observed respectively as syndiotacticity, heterotacticity and isotacticity in $^1$H-NMR measurement using deuterated chloroform as the solvent are added to express the total as 100%, and the percentages of the integrated intensities of the respective peaks are obtained as syndiotacticity, heterotacticity and isotacticity.

With regard to the methacrylic resins (B) used in this invention, in view of heat resistance and flowability, it is preferred that at least one of the methacrylic resins (B) has a weight average molecular weight of 50,000 to 450,000. A more preferred range is 70,000 to 200,000, and a further more preferred range is 90,000 to 150,000. The weight average molecular weight in this specification refers to the weight average molecular weight as polymethyl methacrylate (PMMA) measured by GPC using hexafluoroisopropanol as the solvent.

With regard to the methacrylic resins (B) used in this invention, in view of heat resistance, it is preferred that at least one of the methacrylic resins (B) has a glass transition temperature of 110° C. or higher. More preferred is 115° C. or higher, and further more preferred is 120° C. or higher. The upper limit is not especially limited, but in view of flowability, 150° C. or lower is preferred. The glass transition temperature in this specification refers to the value measured according to the method described in JIS K 7121, being the half point glass transition temperature measured by DSC at a heating rate of 20° C./min.

With regard to the methacrylic resins (B) used in this invention, in view of heat resistance, it is preferred at least one of the methacrylic resins (B) has a syndiotacticity of 40% or more. More preferred is 45% or more, and further more preferred is 50% or more. Especially preferred is 60% or more. In view of flowability, 90% or less is preferred, and 80% or less is more preferred. Further, with regard to the heterotacticity of the methacrylic resins (B), in view of heat resistance, 45% or less is preferred and 40% or less is more preferred. In view of flowability, 20% or more is preferred, and 30% or more is more preferred. Furthermore, with regard to the isotacticity of the methacrylic resins (B), in view of heat resistance, 20% or less is preferred, and 15% or less is more preferred. In view of flowability, 5% or more is preferred, and 8% or more is more preferred; 10% or more is further more preferred.

With regard to the methacrylic resins (B) used in this invention, in view of flowability, it is preferred that at least one of the methacrylic resins (B) has a melt flow rate (MFR) of 0.1 to 40 g/10 min at a temperature of 230° C. and at a load of 37.2 N. A more preferred range is 1 to 30 g/10 min, and a further more preferred range is 2 to 20 g/10 min. It is not preferred that MFR is less than 0.1 g/10 min for such reasons that flowability declines and that moldability tends to be low. It is not preferred either that MFR is more than 40 g/10 min, since the effect of enhancing heat resistance tends to decline.

With regard to the methacrylic resins (B) used in this invention, the composition consisting of two or more methacrylic resins is not especially limited. However, in view of heat resistance and flowability, if the methacrylic resin showing the highest glass transition temperature or the highest syndiotacticity is methacrylic resin 1 and the methacrylic resin showing the lowest glass transition temperature or the lowest syndiotacticity is methacrylic resin 2, then it is preferred that the ratio by weight of the methacrylic resin 1 to the methacrylic resin 2 (methacrylic resin 1/methacrylic resin 2) is 10/90 to 90/10. A more preferred range is 60/40 to 40/60.

As the method for producing the methacrylic resins (B) used in this invention, a publicly known polymerization method such as bulk polymerization, solution polymerization, suspension polymerization or emulsion polymerization can be used. The temperature condition during polymerization is not especially limited, but in view of the heat resistance of the methacrylic resins, 100° C. or lower is preferred, and 70° C. or lower is more preferred. Further more preferred is 30° C. or lower, and especially preferred is −10° C. or lower.

In this invention, the mixing ratio of the polylactic acid-based resin (A) and the methacrylic resins (B) is not especially limited, but in view of heat resistance and flowability, it is preferred that the ratio by weight of {polylactic acid-based resin (A)/methacrylic resins (B)} is 99/1 to 1/99. A more preferred range is 90/10 to 10/90, and a further more preferred range is 80/20 to 20/80. An especially preferred range is 70/30 to 30/70, and the most preferred range is 59/41 to 35/65.

In this invention, in view of impact resistance, it is preferred to further comprise a multilayer structure polymer formed as particles each consisting of a core layer and one or more shell layers covering it (C).

The multilayer structure polymer formed as particles each consisting of a core layer and one or more shell layers covering it (C) is a polymer consisting of a core layer and one or more shell layers covering it and having a structure called core/shell type in which adjacent layers are formed of dissimilar polymers.

With regard to the multilayer structure polymer formed as particles each consisting of a core layer and one or more shell layers covering it (C) used in this invention, the number of layers forming the multilayer structure polymer is not especially limited, and it is only required that the multilayer structure polymer consists of two or more layers. It can also consist of three or more layers, or four or more layers.

It is preferred that the multilayer structure polymer formed as particles each consisting of a core layer and one or more shell layers covering it (C) used in this invention is a multilayer structure polymer having at least one or more rubber layers inside. The material of the rubber layer is not especially limited, and it is only required that the rubber layer comprises a polymer component with rubbery elasticity. For example, a rubber comprising a polymer obtained by polymerizing a (meth) acrylic component, silicone component, styrene component, nitrile component, conjugated diene component, urethane component or ethylene propylene component, etc. can be used. A preferred rubber is, for example, a rubber comprising a polymer obtained by polymerizing a (meth) acrylic component such as ethyl (meth) acrylate units, butyl (meth) acrylate units, 2-ethylhexyl (meth) acrylate units or benzyl (meth) acrylate units, a silicone component such as dimethylsiloxane units or phenylmethylsiloxane units, a styrene component such as styrene units or α-methylstyrene units, a nitrile component such as acrylonitrile units or methacrylonitrile units or a conjugated diene component such as butadiene units or isoprene units. A crosslinked rubber obtained by copolymerizing any of these components with a crosslinkable component such as divinylbenzene units, allyl (meth) acrylate units or butylene glycol diacrylate units and subsequently crosslinking is also preferred. Among them, in view of transparency and impact resistance, a crosslinked rubber is preferred as the rubber layer, and a crosslinked rubber with a glass transition temperature of 0° C. or lower is more preferred. As the material of the rubber layer, it is more preferred to appropriately select components such as ethyl acrylate units, 2-ethylhexyl acrylate units, butyl acrylate units, benzyl acrylate units and allyl methacrylate units for using them together. It is especially preferred that the amount of allyl methacrylate units is 0.005 to 3 wt % based on the weight of all the units constituting the rubber layer.

In the multilayer structure polymer of this invention, the materials of the layers other than the rubber layer are not especially limited, if they are thermoplastic polymer components. However, in view of transparency, heat resistance and impact resistance, polymer components higher in glass transition temperature than the rubber layer are preferred. The thermoplastic polymer can be a polymer containing at least one or more types of units selected from unsaturated carboxylic acid alkyl ester units, glycidyl group-containing vinyl units, unsaturated dicarboxylic anhydride units, aliphatic vinyl units, aromatic vinyl units, vinyl cyanide units, maleimide units, unsaturated dicarboxylic acid units, other vinyl units, etc. Above all, a polymer containing at least one or more types of units selected from unsaturated carboxylic acid alkyl ester units, unsaturated glycidyl group-containing units and unsaturated dicarboxylic anhydride units is preferred, and a polymer containing at least one or more types of units selected from unsaturated glycidyl group-containing units and unsaturated dicarboxylic anhydride units is more preferred.

The unsaturated carboxylic acid alkyl ester units are not especially limited, and (meth)acrylic acid alkyl esters can be preferably used. Examples of them include methyl (meth) acrylate, ethyl (meth)acrylate, n-propyl (meth)acrylate, n-butyl (meth)acrylate, t-butyl (meth)acrylate, n-hexyl (meth) acrylate, 2-ethylhexyl (meth)acrylate, cyclohexyl (meth) acrylate, stearyl (meth)acrylate, octadecyl (meth)acrylate, phenyl (meth)acrylate, benzyl (meth)acrylate, chloromethyl (meth)acrylate, 2-chloroethyl (meth)acrylate, 2-hydroxyethyl (meth)acrylate, 3-hydroxypropyl (meth)acrylate, 2,3,4,5,6-pentahydroxyhexyl (meth)acrylate, 2,3,4,5-tetrahydroxypentyl (meth)acrylate, aminoethyl acrylate, propylaminoethyl acrylate, dimethylaminoethyl methacrylate, ethylaminopropyl methacrylate, phenylaminoethyl methacrylate, cyclohexylaminoethyl methacrylate, etc. In view of a large effect of enhancing impact resistance, methyl (meth)acrylate can be preferably used. Any one type of these units can be used alone, or two or more types of these units can also be used together.

The glycidyl group-containing vinyl units are not especially limited, and examples of them include glycidyl (meth) acrylate, glycidyl itaconate, diglycidyl itaconate, allyl glycidyl ether, styrene-4-glycidyl ether, 4-glycidyl styrene, etc. In view of a large effect of enhancing impact resistance, glycidyl (meth)acrylate can be preferably used. Any one of these types of units can be used alone, or two or more of them can also be used together.

Examples of the unsaturated dicarboxylic anhydride units include maleic anhydride, itaconic anhydride, glutaconic anhydride, citraconic anhydride, aconitic anhydride, etc. In view of a large effect of enhancing impact resistance, maleic anhydride can be preferably used. Any one of these types of units can be used alone, or two or more of them can also be used together.

Further, examples of the aliphatic vinyl units include ethylene, propylene, butadiene, etc. Examples of the aromatic vinyl units include styrene, α-methylstyrene, 1-vinylnaphthalene, 4-methylstyrene, 4-propylstyrene, 4-cyclohexylstyrene, 4-dodecylstyrene, 2-ethyl-4-benzylstyrene, 4-(phenylbutyl)styrene, halogenated styrene, etc. Examples of the vinyl cyanide units include acrylonitrile, methacrylonitrile, ethacrylonitrile, etc. Examples of the maleimide units include maleimide, N-methylmaleimide, N-ethylmaleimide, N-propylmaleimide, N-isopropylmaleimide, N-cyclohexylmaleimide, N-phenylmaleimide, N-(p-bromophenyl)maleimide, N-(chlorophenyl)maleimide, etc. Examples of the unsaturated dicarboxylic acid units include maleic acid, maleic acid monoethyl ester, itaconic acid, phthalic acid, etc. Examples of the other vinyl units include acrylamide, methacrylamide, N-methylacrylamide, butoxymethylacrylamide, N-propylmethacrylamide, N-vinyldiethylamine, N-acetylvinylamine, allylamine, methallylamine, N-methylallylamine, p-aminostyrene, 2-isopropenyl-oxazoline, 2-vinyl-oxazoline, 2-acroyl-oxazone, 2-styryl-oxazoline, etc. Any one of these types of units can be used alone, or two or more of them can also be used together.

With regard to the multilayer structure polymer formed as particles each consisting of a core layer and one or more shell layers covering it (C), the material of the shell layers is not especially limited. Examples of the material of the shell layers include polymers containing unsaturated carboxylic acid alkyl ester units, glycidyl group-containing vinyl units, aliphatic vinyl units, aromatic vinyl units, vinyl cyanide units, maleimide units, unsaturated dicarboxylic acid units, unsaturated dicarboxylic anhydride units and/or other vinyl units, etc. In view of transparency and impact resistance, a multilayer structure polymer comprising a polymer containing methyl methacrylate units and/or methyl acrylate units is preferred.

As the multilayer structure polymer formed as particles each consisting of a core layer and one or more shell layers covering it (C) used in this invention, a commercially available product can also be used if it satisfies the aforesaid condition, or it can also be produced by a publicly known method.

Commercially available products include, for example, "METABLEN" (core-shell multilayer polymer) produced by Mitsubishi Rayon, "KANE ACE" (core-shell multilayer polymer) produced by Kaneka Corp., "PARALOID" (core-shell multilayer polymer) produced by Rohm and Haas, "STAFILOID" (core-shell multilayer polymer) produced by Ganz Chemical, "PARAFACE" (core-shell multilayer polymer) produced by Kuraray, etc. Any one of them can be used alone, or two or more of them can also be used together.

As a publicly known method, emulsion polymerization is more preferred. As for the production method, at first, a desired monomer mixture is emulsion-polymerized to prepare core particles, and another monomer mixture is emulsion-polymerized in the presence of the core particles, to form a shell layer around the core particles, to prepare core-shell particles. Further in the presence of said particles, a further other monomer mixture is emulsion-polymerized to form another shell layer, to prepare core-shell particles. This reaction is repeated to obtain a desired multilayer structure polymer formed as particles each consisting of a core layer and one or more shell layers covering it. It is preferred that the polymerization temperature for forming the (co)polymers of the respective layers is 0 to 120° C. for every layer. A more preferred range is 5 to 90° C.

The emulsifier used for emulsion polymerization is not especially limited, and can be selected, considering polymerization stability, a desired average primary particle size, etc. It is preferred to use any one or two or more of publicly known emulsifiers such as anionic surfactants, cationic surfactants and nonionic surfactants. An anionic surfactant is more preferred. Examples of the anionic surfactant include carboxylates such as sodium stearate, sodium myristate and sodium N-lauroyl sarcosinate, sulfonates such as sodium dioctylsulfosuccinate and sodium dodecylbenzenesulfonate, sulfuric acid ester salts such as sodium lauryl sulfate, phosphoric acid ester salts such as sodium mono-n-butylphenylpentaoxyethylene phosphate, etc. It is preferred that the added amount of said emulsifier is 0.01 to 15 parts by weight per 100 parts by weight in total of the monomers used.

Further, the polymerization initiator used for emulsion polymerization is not especially limited. Examples of the polymerization initiator include inorganic peroxides such as potassium persulfate and ammonium persulfate, water soluble redox initiators such as hydrogen peroxide-ferrous salt initiators, potassium persulfate-acidic sodium sulfite initiators and ammonium persulfate-acidic sodium sulfite initiators, water soluble-oil soluble redox initiators such as cumene hydroperoxide-sodium formaldehyde sulfoxylate initiators and tert-butyl hydroperoxide-sodium formaldehyde sulfoxylate initiators, etc. Among them, inorganic peroxide initiators and water soluble-oil soluble redox initiators are preferred. It is preferred that the added amount of the polymerization initiator is 0.001 to 5 parts by weight per 100 parts by weight in total of the monomers used.

It is preferred that the multilayer structure polymer formed as particles each consisting of a core layer and one or more shell layers covering it (C) used in this invention satisfies at least one of the following conditions in view of transparency and impact resistance.

(c) The polymer has a refractive index of 1.45 to 1.50.
(d) The polymer contains a component with a glass transition temperature of 30° C. or lower.

Further, in view of excellent transparency, it is preferred that the multilayer structure polymer formed as particles each consisting of a core layer and one or more shell layers covering it (C) has a refractive index of 1.465 to 1.495. Furthermore, it is preferred that the difference between the refractive index of the matrix resin phase consisting of the polylactic acid-based resin (A) and the methacrylic resins (B) and the refractive index of the multilayer structure polymer formed as particles each consisting of a core layer and one or more shell layers covering it (C) is 0.05 or less. More preferred is 0.02 or less, and further more preferred is 0.01 or less. Meanwhile, in this invention, the refractive index is a value measured using an Abbe's refractometer at 23° C. and at a wavelength of 589 nm. Moreover, the refractive index of the matrix resin phase consisting of the polylactic acid-based resin (A) and the methacrylic resins (B) can be obtained from $0.03 \times x/100 + 1.46$, where x denotes the comprised amount (parts by weight) of the methacrylic resins (B) per 100 parts by weight in total of the polylactic acid-based resin (A) and the methacrylic resins (B).

Further, it is more preferred that the multiplayer structure polymer formed as particles each consisting of a core layer and one or more shell layers covering it (C) used in this invention contains a component with a glass transition temperature of 0° C. or lower in view of impact resistance. It is more preferred to contain a component of −30° C. or lower, and it is especially preferred to contain a component of −40° C. or lower. Meanwhile, in this invention, said glass transition temperature is a value measured using a differential scanning calorimeter at a heating rate of 20° C./min.

In this invention, the average primary particle size of the multilayer structure polymer formed as particles each consisting of a core layer and one or more shell layers covering it (C) is not especially limited, but in view of transparency and impact resistance, it is preferred that the size is 10 to 10,000 nm. A more preferred range is 20 to 1,000 nm, and an especially preferred range is 50 to 700 nm. The most preferred range is 100 to 500 nm. Meanwhile, in this invention, the average primary particle size is a number average primary particle size obtained by observing at a 20.000-fold magnification using an electron microscope, measuring the primary particle sizes of given 100 particles, and averaging the measured sizes. Particularly it can be obtained by observing the dispersed forms of the multilayer structure polymer in the resin composition using an electron microscope.

In this invention, the comprised amount of the multilayer structure polymer formed as particles each consisting of a core layer and one or more shell layers covering it (C) is not especially limited. However, in view of impact resistance, it is preferred that the amount is 0.1 to 200 parts by weight per 100 parts by weight in total of the polylactic acid-based resin (A) and the methacrylic resins (B). A more preferred range is 1 to 100 parts by weight, and a further more preferred range is 5 to 50 parts by weight. An especially preferred range is 10 to 30 parts by weight.

In this invention, in view of transparency, heat resistance and impact resistance, it is preferred that the dispersed particle size of the multilayer structure polymer formed as particles each consisting of a core layer and one or more shell layers covering it (C) in the resin composition is 1 to 1,000 nm. A more preferred range is 50 to 750 nm, and a further more preferred range is 100 to 500 nm. Meanwhile in this invention, the dispersed particle size refers to the number average dispersed particle size obtained by observing the resin composition at a 20,000-fold magnification using an electron microscope, measuring the dispersed particle sizes of given 100 dispersed particles, and averaging them. Meanwhile, the number of dispersed particles refers to the value obtained by adding the number of agglomerated particles (1) and the number of non-agglomerated particles (m) obtained according to the following criterion.

In this invention, in view of transparency, heat resistance and impact resistance, it is preferred that the ratio (l/m) of the number of agglomerated particles (l) to the number of non-agglomerated particles (m) of the multilayer structure polymer formed as particles each consisting a core layer and one or more shell layers covering it (C) in the resin composition is 0 to 0.5. A more preferred range is 0 to 0.4. Meanwhile, in this invention, with regard to the number of agglomerated particles and the number of non-agglomerated particles, in the case where given 100 particles dispersed as the multilayer structure polymer formed as particles each consisting of a core layer and one or more shell layers covering it (C) are observed at a 20.000-fold magnification using an electron microscope, if there are particles that contact each other, those particles are judged as agglomerated particles. Further, 1 indicates the number of all the dispersed particles participating in cohesion. If three dispersed particles cohere to form one aggregate, calculation is made with l=3.

In this invention, for such reasons that transparency, heat resistance and impact resistance can be enhanced and that hydrolysis resistance can be enhanced, it is preferred to further comprise a reactive compound containing at least one or more types of functional groups selected from glycidyl groups, acid anhydride groups, carbodiimide groups and oxazoline groups as the reactive compound (D). Further, in this invention, in the case where the multilayer structure polymer formed as particles each consisting of a core layer and one or more shell layers covering it (C) is comprised, it is preferred to comprise the reactive compound (D), since the dispersibility of the multilayer structure polymer can be enhanced to increase the effect of enhancing impact resistance.

The reactive compounds containing glycidyl groups, which can be preferably used in this invention, include a glycidyl ether compound, glycidyl ester compound, glycidyl amine compound, glycidylimide compound and alicyclic epoxy compound. If any of these reactive compounds containing glycidyl groups is comprised, a molded article excellent in mechanical properties, moldability, heat resistance and durability can be obtained.

Examples of the glycidyl ether compound include butyl glycidyl ether, stearyl glycidyl ether, allyl glycidyl ether, phenyl glycidyl ether, o-phenylphenyl glycidyl ether, ethylene oxide lauryl alcohol glycidyl ether, ethylene oxide phenol glycidyl ether, ethylene glycol diglycidyl ether, polyethylene glycol diglycidyl ether, propylene glycol diglycidyl ether, polypropylene glycol diglycidyl ether, neopentyl glycol diglycidyl ether, polytetramethylene glycol diglycidyl ether, cyclohexanedimethanol diglycidyl ether, glycerol triglycidyl ether, trimethylolpropane triglycidyl ether, pentaerythritol polyglycidyl ether, bisphenol A diglycidyl ether type epoxy resins obtained by condensation reaction between a bisphenol such as 2,2-bis(4-hydroxyphenyl)propane, 2,2-bis(4-hydroxyphenyl)methane or bis(4-hydroxyphenyl)sulfone and epichlorohydrin, bisphenol F diglycidyl ether type epoxy resins, bisphenol S diglycidyl ether type epoxy resins, etc. Among them, bisphenol A diglycidyl ether type epoxy resins are preferred.

Examples of the glycidyl ester compound include benzoic acid glycidyl ester, p-toluic acid glycidyl ester, cyclohexanecarboxylic acid glycidyl ester, stearic acid glycidyl ester, lauric acid glycidyl ester, palmitic acid glycidyl ester, versatic acid glycidyl ester, oleic acid glycidyl ester, linoleic acid glycidyl ester, linolenic acid glycidyl ester, terephthalic acid diglycidyl ester, isophthalic acid diglycidyl ester, phthalic acid diglycidyl ester, naphthalenedicarboxylic acid diglycidyl ester, bibenzoic acid diglycidyl ester, methylterephthalic acid diglycidyl ester, hexahydrophthalic acid diglycidyl ester, tetrahydrophthalic acid diglycidyl ester, cyclohexanedicarboxylic acid diglycidyl ester, adipic acid diglycidyl ester, succinic acid diglycidyl ester, sebacic acid diglycidyl ester, dodecanedionic acid diglycidyl ester, octadecanedicarboxylic acid diglycidyl ester, trimellitic acid triglycidyl ester, pyromellitic acid tetraglycidyl ester, etc. Above all, benzoic acid glycidyl ester and versatic acid glycidyl ester are preferred.

Examples of the glycidyl amine compound include tetraglycidylaminodiphenylmethane, triglycidyl-paraminophenol, triglycidyl-metaminophenol, diglycidyl aniline, diglycidyl toluidine, tetraglycidyl metaxylenediamine, diglycidyl tribromoaniline, tetraglycidyl bisaminomethylcyclohexane, triglycidyl cyanurate, triglycidyl isocyanurate, etc.

Examples of the glycidylimide compound include N-glycidyl phthalimide, N-glycidyl-4-methylphthalimide, N-glycidyl-4,5-dimethylphthalimide, N-glycidyl-3-methylphthalimide, N-glycidyl-3,6-dimethylphthalimide, N-glycidyl-4-ethoxyphthalimide, N-glycidyl-4-chlorophthalimide, N-glycidyl-4,5-dichlorophthalimide, N-glycidyl-3,4,5,6-tetrabromophthalimide, N-glycidyl-4-n-butyl-5-bromophthalimide, N-glycidylsuccinimide, N-glycidyl hexahydrophthalimide, N-glycidyl-1,2,3,6-tetrahydrophthalimide, N-glycidyl maleinamide, N-glycidyl-α,β-dimethylsuccinimide, N-glycidyl-α-ethylsuccinimide, N-glycidyl-α-propylsuccinimide, N-glycidyl benzamide, N-glycidyl-p-methylbenzamide, N-glycidyl naphthamide, N-glycidyl steramide, etc. Above all, N-glycidyl phthalimide is preferred.

Examples of the alicyclic epoxy compound include 3,4-epoxycyclohexylmethyl-3,4-epoxycyclohexylcarboxylate, bis(3,4-epoxycyclohexylmethyl) adipate, vinylcyclohexene diepoxide, N-methyl-4,5-epoxycyclohexane-1,2-dicarboxylic acid imide, N-ethyl-4,5-epoxycyclohexane-1,2-dicarboxylic acid imide, N-phenyl-4,5-epoxycyclohexane-1,2-dicarboxylic acid imide, N-naphthyl-4,5-epoxycyclohexane-1,2-dicarboxylic acid imide, N-tolyl-3-methyl-4,5-epoxycyclohexane-1,2-dicarboxylic acid amide, etc. Further, epoxy modified fatty acid glycerides such as epoxylated soybean oil, epoxylated linseed oil and epoxylated whale oil, phenol novolak type epoxy resin, cresol novolak type epoxy resin, etc.

In this invention, examples of the reactive compound containing acid anhydride groups include succinic anhydride, maleic anhydride, phthalic anhydride, etc. Further, they include polymers containing any of the aforesaid compounds as monomer units.

In this invention, the reactive compound containing carbodiimide groups refers to a compound having at least one carbodiimide group represented by (—N=C=N—) in the molecule and can be produced, for example, by heating an organic isocyanate in the presence of an appropriate catalyst for decarboxylation reaction.

Examples of the carbodiimide compound include mono- or dicarbodiimide compounds such as diphenylcarbodiimide, dicyclohexylcarbodiimide, di-2,6-dimethylphenylcarbodiimide, diisopropylcarbodiimide, dioctyldecylcarbodiimide, di-o-toluoylcarbodiimide, di-p-toluoylcarbodiimide, di-p-nitrophenylcarbodiimide, di-p-aminophenylcarbodiimide, di-p-hydroxyphenylcarbodiimide, di-p-chlorophenylcarbodiimide, di-o-chlorophenylcarbodiimide, di-3,4-dichlorophenylcarbodiimide, di-2,5-dichlorophenylcarbodiimide, p-phenylene-bis-o-toluoylcarbodiimide, p-phenylene-bis-dicyclohexylcarbodiimide, p-phenylene-bis-di-p-chlorophenylcarbodiimide, 2,6,2',6'-tetraisopropyldiphenylcarbodiimide, hexamethylene-bis-cyclohexylcarbodiimide, ethylene-bis-diphenylcarbodiimide, ethylene-bis-dicyclohexylcarbodiimide, N,N'-di-o-toluoylcarbodiimide, N,N'-diphenylcarbodiimide, N,N'-dioctyldecylcarbodiimide, N,N'-di-2,6-dimethylphenylcarbodiimide, N-toluoyl-N'-cyclohexylcarbodiimide, N,N'-di-2,6-diisopropylphenylcarbodiimide, N,N'-di-2,6-di-tert-butylphenylcarbodiimide, N-toluoyl-N'-phenylcarbodiimide, N,N'-di-p-nitrophenylcarbodiimide, N,N'-di-p-aminophenylcarbodiimide, N,N'-di-p-hydroxyphenylcarbodiimide, N,N'-di-cyclohexylcarbodiimide, N,N'-di-p-toluoylcarbodiimide, N,N'-benzylcarbodiimide, N-octadecyl-N'-phenylcarbodiimide, N-benzyl-N'-phenylcarbodiimide, N-octadecyl-N'-tolylcarbodiimide, N-cyclohexyl-N'-tolylcarbodiimide, N-phenyl-N'-tolylcarbodiimide, N-benzyl-N'-tolylcarbodiimide, N,N'-di-o-ethylphenylcarbodiimide, N,N'-di-p-ethylphenylcarbodiimide, N,N'-di-o-isopropylphenylcarbodiimide, N,N'-di-p-isopropylphenylcarbodiimide, N,N'-di-o-isobutylphenylcarbodiimide, N,N'-di-p-isobutylphenylcarbodiimide, N,N'-di-2,6-diethylphenylcarbodiimide, N,N'-di-2-ethyl-6-isopropylphenylcarbodiimide, N,N'-di-2-isobutyl-6-isopropylphenylcarbodiimide, N,N'-di-2,4,6-trimethylphenylcarbodiimide, N,N'-di-2,4,6-triisopropylphenylcarbodiimide and N,N'-di-2,4,6-triisobutylphenylcarbodiimide, and polycarbodiimides such as poly(1,6-hexamethylenecarbodiimide), poly(4,4'-methylenebiscyclohexylcarbodiimide), poly(1,3-cyclohexylenecarbodiimide), poly(1,4-cyclohexylenecarbodiimide), poly(4,4'-diphenylmethanecarbodiimide), poly(3,3'-dimethyl-4,4'-diphenylmethanecarbodiimide), poly(naphthylenecarbodiimide), poly(p-phenylenecarbodiimide), poly(m-phenylenecarbodiimide), poly(tolylcarbodiimide), poly(diisopropylcarbodiimide), poly(methyl-diisopropylphenylenecarbodiimide), poly(triethylphenylenecarbodiimide) and poly(triisopropylphenylenecarbodiimide), etc. Above all, N,N'-di-2,6-diisopropylphenylcarbodiimide, 2,6,2',6'-tetraisopropyldiphenylcarbodiimide and polycarbodiimides are preferred.

In this invention, examples of the reactive compound containing oxazoline groups include 2-methoxy-2-oxazoline, 2-ethoxy-2-oxazoline, 2-propoxy-2-oxazoline, 2-butoxy-2-oxazoline, 2-pentyloxy-2-oxazoline, 2-hexyloxy-2-oxazoline, 2-heptyloxy-2-oxazoline, 2-octyloxy-2-oxazoline, 2-nonyloxy-2-oxazoline, 2-decyloxy-2-oxazoline, 2-cyclopentyloxy-2-oxazoline, 2-cyclohexyloxy-2-oxazoline, 2-allyloxy-2-oxazoline, 2-methallyloxy-2-oxazoline, 2-crotyloxy-2-oxazoline, 2-phenoxy-2-oxazoline, 2-cresyl-2-oxazoline, 2-o-ethylphenoxy-2-oxazoline, 2-o-propylphenoxy-2-oxazoline, 2-o-phenylphenoxy-2-oxazoline, 2-m-ethylphenoxy-2-oxazoline, 2-m-propylphenoxy-2-oxazoline, 2-p-phenylphenoxy-2-oxazoline, 2-methyl-2-oxazoline, 2-ethyl-2-oxazoline, 2-propyl-2-oxazoline, 2-butyl-2-oxazoline, 2-pentyl-2-oxazoline, 2-hexyl-2-oxazoline, 2-heptyl-2-oxazoline, 2-octyl-2-oxazoline, 2-nonyl-2-oxazoline, 2-decyl-2-oxazoline, 2-cyclopentyl-2-oxazoline, 2-cyclohexyl-2-oxazoline, 2-allyl-2-oxazoline, 2-methallyl-2-oxazoline, 2-crotyl-2-oxazoline, 2-phenyl-2-oxazoline, 2-o-ethylphenyl-2-oxazoline, 2-o-propylphenyl-2-oxazoline, 2-o-phenylphenyl-2-oxazoline, 2-m-ethylphenyl-2-oxazoline, 2-m-propylphenyl-2-oxazoline, 2-p-phenylphenyl-2-oxazoline, 2,2'-bis(2-oxazoline), 2,2'-bis(4-methyl-2-oxazoline), 2,2'-bis(4,4'-dimethyl-2-oxazoline), 2,2'-bis(4-ethyl-2-oxazoline), 2,2'-bis(4,4'-diethyl-2-oxazoline), 2,2'-bis(4-propyl-2-oxazoline), 2,2'-bis(4-butyl-2-oxazoline), 2,2'-bis(4-hexyl-2-oxazoline), 2,2'-bis(4-phenyl-2-oxazoline), 2,2'-bis(4-cyclohexyl-2-oxazoline), 2,2'-bis(4-benzyl-2-oxazoline), 2,2'-p-phenylenebis(2-oxazoline), 2,2'-m-phenylenebis(2-oxazoline), 2,2'-o-phenylenebis(2-oxazoline), 2,2'-p-phenylenebis(4-methyl-2-oxazoline), 2,2'-p-phenylenebis(4,4'-dimethyl-2-oxazoline), 2,2'-m-phenylenebis(4-methyl-2-oxazoline), 2,2'-m-phenylenebis(4,4'-dimethyl-2-oxazoline), 2,2'-ethylenebis(2-oxazoline), 2,2'-tetramethylenebis(2-oxazoline), 2,2'-hexamethylenebis(2-oxazoline), 2,2'-octamethylenebis(2-oxazoline), 2,2'-decamethylenebis(2-oxazoline), 2,2'-ethylenebis(4-methyl-2-oxazoline), 2,2'-tetramethylenebis(4,4'-dimethyl-2-oxazoline), 2,2'-9,9'-diphenoxyethanebis(2-oxazoline), 2,2'-cyclohexylenebis(2-oxazoline), 2,2'-diphenylenebis(2-oxazoline), etc. They also include polyoxazoline compounds containing any one of the aforesaid compounds as monomer units, etc.

In this invention, it is preferred that the reactive compound (D) is a polymer with a weight average molecular weight of 1,000 to 300,000, since bleeding-out can be inhibited. A more preferred range is 5,000 to 250,000. It is preferred that the reactive compound (D) with such a weight average molecular weight is a polymer having at least one or more types of functional groups selected from glycidyl groups, acid anhydride groups, carbodiimide groups and oxazoline groups introduced into the main chain or side chains in the molecule. The polymer can be either a homopolymer or a copolymer. As the copolymer, any one of random copolymer, bulk copolymer and graft copolymer can be used.

In this invention, in view of transparency, heat resistance and impact resistance, it is preferred that the reactive compound (D) is a polymer containing glycidyl group-containing vinyl units.

In this invention, examples of the monomer used as a raw material capable forming the glycidyl group-containing vinyl units include glycidyl esters of unsaturated monocarboxylic acids such as glycidyl (meth) acrylate and glycidyl p-styrylcarboxylate, monoglycidyl esters and polyglycidyl esters of unsaturated polycarboxylic acids such as maleic acid and itaconic acid, unsaturated glycidyl ethers such as allyl glycidyl ether, 2-methylallyl glycidyl ether and styrene-4-glycidyl ether. Among them, glycidyl acrylate and glycidyl methacrylate can be preferably used in view of radical polymerizability. Any one of them can be used alone, or two or more of them can also be used together.

In this invention, it is preferred that the polymer containing glycidyl group-containing vinyl units contain other vinyl units other than the glycidyl group-containing vinyl units as a copolymer component. The other vinyl units can be selectively used to adjust the melting point, glass transition temperature, etc. of the polymer. The other vinyl units than the glycidyl group-containing vinyl units include acrylic vinyl units, carboxylic acid vinyl ester units, aromatic vinyl units, unsaturated dicarboxylic anhydride units, unsaturated dicarboxylic acid units, aliphatic vinyl units, maleimide units, other vinyl units, etc.

Examples of the monomer used as the raw material capable of forming acrylic vinyl units include acrylic acid, methacrylic acid, methyl acrylate, methyl methacrylate, ethyl acrylate, ethyl methacrylate, propyl acrylate, propyl methacrylate, n-butyl acrylate, n-butyl methacrylate, isobutyl acrylate, isobutyl methacrylate, t-butyl acrylate, t-butyl methacrylate, 2-ethylhexyl acrylate, 2-ethylhexyl methacrylate, cyclohexyl acrylate, cyclohexyl methacrylate, isobornyl acrylate, isobornyl methacrylate, lauryl acrylate, lauryl methacrylate, stearyl acrylate, stearyl methacrylate, hydroxyethyl acrylate, hydroxyethyl methacrylate, hydroxypropyl acrylate, hydroxypropyl methacrylate, acrylic acid esters and methacrylic acid esters of polyethylene glycol and polypropylene glycol, trimethoxysilylpropyl acrylate, trimethoxysilylpropyl methacrylate, methyldimethoxysilylpropyl acrylate, methyldimethoxysilylpropyl methacrylate, acrylonitrile, methacrylonitrile, N,N-dialkylacrylamides, N,N-dialkylmethacrylamides, α-hydroxymethylacrylic acid esters, monomers as raw materials capable of forming amino group-containing acrylic vinyl units such as dimethylaminoethyl acrylate and dimethylaminoethyl methacrylate, etc. Above all, preferred are acrylic acid, methacrylic acid, methyl acrylate, methyl methacrylate, ethyl acrylate, ethyl methacrylate, propyl acrylate, propyl methacrylate, n-butyl acrylate, n-butyl methacrylate, isobutyl acrylate, isobutyl methacrylate, t-butyl acrylate, t-butyl methacrylate, 2-ethylhexyl acrylate, 2-ethylhexyl methacrylate, cyclohexyl acrylate, cyclohexyl methacrylate, isobornyl acrylate, isobornyl methacrylate, acrylonitrile and methacrylonitrile. More preferred are acrylic acid, methacrylic acid, methyl acrylate, methyl methacrylate, ethyl acrylate, ethyl methacrylate, n-butyl acrylate, n-butyl methacrylate, 2-ethylhexyl acrylate, 2-ethylhexyl methacrylate, acrylonitrile and methacrylonitrile. Any one of them can be used alone, or two or more of them can also be used together.

Examples of the monomer used as raw material capable of forming carboxylic acid vinyl ester units include monofunctional aliphatic vinyl carboxylates such as vinyl formate, vinyl acetate, vinyl propionate, vinyl butyrate, vinyl caproate, vinyl caprylate, vinyl caprate, vinyl laurate, vinyl myristate, vinyl palmitate, vinyl stearate, isopropenyl acetate, 1-butenyl acetate, vinyl pivalate, vinyl 2-ethylhexanoate and vinyl cyclohexanecarboxylate, aromatic vinyl carboxylates such as vinyl benzoate and vinyl cinnamate, polyfunctional vinyl carboxylates such as vinyl monochloroacetate, divinyl adipate, vinyl methacrylate, vinyl crotonate and vinyl sorbate, etc. Among them, vinyl acetate can be preferably used. Any one of them can be used alone, or two or more of them can also be used together.

Examples of the monomer used as the raw material capable of forming aromatic vinyl units include styrene, α-methylstyrene, p-methylstyrene, a-methyl-p-methylstyrene, p-methoxystyrene, o-methoxystyrene, 2,4-dimethylstyrene, 1-vinylnaphthalene, chlorostyrene, bromostyrene, divinylbenzene, vinyltoluene, etc. Among them, styrene and α-methyl styrene can be preferably used. Any one of them can be used alone, or two or more of them can also be used together.

Examples of the monomer used as the raw material capable of forming unsaturated dicarboxylic anhydride units include maleic anhydride, itaconic anhydride, glutaconic anhydride, citraconic anhydride, aconitic anhydride, etc. Among them, maleic anhydride can be preferably used. Any one of them can be used alone, or two or more of them can also be used together.

Examples of the monomer used as the raw material capable of forming unsaturated dicarboxylic acid units include maleic acid, maleic acid monoethyl ester, itaconic acid, phthalic acid, etc. Among them, maleic acid and itaconic acid can be preferably used. Any one of them can be used alone, or two or more of them can also be used together.

Examples of the monomer used as the raw material capable of forming aliphatic vinyl units include ethylene, propylene, butadiene, etc. Examples of the monomer used as the raw material capable of forming maleimide units include maleimide, N-methylmaleimide, N-ethylmaleimide, N-propylmaleimide, N-isopropylmaleimide, N-cyclohexylmaleimide, N-phenylmaleimide, N-(p-bromophenyl) maleimide, N-(chlorophenyl)maleimide, etc. Examples of the monomer used as the raw material capable of forming other vinyl units include N-vinyldiethylamine, N-acetylvinylamine, allylamine, methallylamine, N-methylallylamine, p-aminostyrene, etc. Any one of them can be used alone, or two or more of them can also be used together.

In this invention, the glass transition temperature of the polymer containing glycidyl group-containing vinyl units is not especially limited, but in view of handling convenience, a range from 30 to 100° C. is preferred. A range from 40 to 70° C. is more preferred, and a range from 50 to 65° C. is most preferred. The glass transition temperature in this specification refers to the value measured by DSC. Meanwhile, the glass transition temperature of the polymer containing glycidyl group-containing vinyl units can be controlled by adjusting the composition of the copolymer components. The glass transition temperature can be usually raised by copolymerizing aromatic vinyl units such as styrene and lowered by copolymerizing acrylic acid ester units such as butyl acrylate.

In this invention, the polymer containing the glycidyl group-containing vinyl units usually contain a volatile component, since the unreactive monomer as the raw material, solvent, etc. remain. The amount of the non-volatile component as the balance is not especially limited, but for inhibiting gas generation, it is preferred that the amount of the nonvolatile component is larger. Particularly preferred is 95 wt % or more, and more preferred is 97 wt % or more. Further more preferred is 98 wt % or more, and most preferred is 98.5 wt % or more. Meanwhile, the nonvolatile component refers to the remaining rate in the case where 10 g of a sample is heated at 110° C. for 1 hour in nitrogen atmosphere.

In this invention, in order that the polymer containing glycidyl group-containing vinyl units can be lowered in molecular weight, a sulfur compound may be used as a chain transfer agent (molecular weight modifier). In this case, the polymer usually contains sulfur. In this case, the sulfur content is not especially limited, but for inhibiting offensive odor, it is preferred that the sulfur content is smaller. Particularly it is preferred that the amount of sulfur atoms is 1,000 ppm or less. More preferred is 100 ppm or less, and further more preferred is 10 ppm or less. Especially most preferred is 1 ppm or less.

In this invention, the method for producing the polymer containing glycidyl group-containing vinyl units is not especially limited, as far as the conditions specified in this invention are satisfied. Publicly known polymerization methods such as bulk polymerization, solution polymerization, suspension polymerization and emulsion polymerization can be used. In the case where any of these methods is used, a polymerization initiator, chain transfer agent, solvent, etc. may be used, and these compounds may remain as impurities in the finally obtained polymer containing glycidyl group-containing vinyl units. The amount of these impurities is not especially limited, but for inhibiting the lowering of heat resistance, weather resistance, etc., it is preferred that the amount of impurities is smaller. Particularly, it is preferred that the amount of impurities is 10 wt % or less based on the weight of the finally obtained polymer. More preferred is 5 wt % or less, and further more preferred is 3 wt % or less. Especially most preferred is 1 wt % or less.

As the method for producing the polymer containing glycidyl group-containing vinyl units, which is satisfied, for example, in molecular weight, glass transition temperature, nonvolatile component content, sulfur content, impurity content as described above, preferred is a method of continuously bulk-polymerizing at a high temperature of 150° C. or higher under pressurization (preferably 1 MPa or higher) for a short time (preferably 5 minutes to 30 minutes), for such reasons that the rate of polymerization is high and that the polymerization initiator, chain transfer agent and solvent causing impurities and a large sulfur content are not used.

In this invention, it is preferred that the comprised amount of the reactive compound (D) is 0.01 to 30 parts by weight per 100 parts by weight in total of the polylactic acid-based resin (A) and the methacrylic resins (B). A more preferred range is 0.05 to 20 parts by weight, and a further more preferred range is 0.1 to 10 parts by weight. An especially preferred range is 0.5 to 3 parts by weight. If the comprised amount of the reactive compound (D) is less than 0.01 part by weight, the effect of enhancing the impact resistance of the resin composition tends to be insufficient, and if it is more than 30 parts by weight, gelation, etc. may lower the flowability.

In this invention, in view of heat resistance, it is preferred that the inorganic particles (E) are comprised, and that the inorganic particles in the resin composition are 1 to 300 nm in the length of their minor axes and 1 to 1,000 nm in the length of their major axes. In view of transparency, it is more preferred that the inorganic particles (E) are 5 to 200 Jam, especially preferably 10 to 100 nm in the length of their minor axes, and are 10 to 900 nm, especially preferably 50 to 800 nm in the length of their major axes. With regard to the length of minor axes and the length of major axes of the inorganic particles in this invention, the resin composition is observed at a 20,000-fold magnification using an electron microscope, and the shapes of given 20 inorganic particles, preferably 100 inorganic particles are observed and measured. The shortest length of each particle is identified as the minor axis direction, and the longest length of each particle is identified as the major axis direction. The shortest lengths and the longest lengths of the respective particles are averaged respectively to obtain the length of minor axes and the length of major axes of the inorganic particles.

In this invention, the inorganic particles (E) can be granular, spherical, tabular or fibrous, but in view of heat resistance, it is preferred that the inorganic particles are tabular.

In this invention, as granular or spherical inorganic particles, zinc oxide, magnesium oxide, iron oxide, titanium oxide, titania, zirconia, seria, alumina, silica, calcium carbonate, talc, mica, kaolin, graphite powder, carbon black, etc. can be used. Among them, silica is preferred.

In this invention, as tabular inorganic particles, silicates such as talc, mica, glass flakes, montmorillonite and smectites can be used. Among them, silicates are preferred.

In this invention, as fibrous inorganic particles, glass fibers, carbon fibers, zinc oxide, alumina, calcium titanate, potassium titanate, barium titanate, aluminum borate, magnesium borate, magnesium oxysulfate fibers, etc. can be used.

In this invention, it is more preferred that the inorganic particles (E) contain silicon. Particularly, silica, silicates, etc. can be contained. Among them, a layered silicate is more preferred, and an organically modified layered silicate is further more preferred. Meanwhile, in this invention, an electron microscope—energy dispersive X-ray analyzer (EDX) can be used to perform elementary analysis for identifying inorganic particles and detecting silicon.

In this invention, silica can be a powder or a sol dispersed in water or an organic solvent (colloidal silica). In view of transparency, colloidal silica is preferred. Further, in view of transparency, it is preferred that the silica is treated on the surface with at least one or more types of functional groups selected from hydroxyl groups, amino groups, amide groups, carboxyl groups, glycidyl groups, acid anhydride groups, carbodiimide groups and oxazoline groups. If surface-treated silica is used, its affinity with the matrix resin can be enhanced, to give an effect of inhibiting the cohesion of inorganic particles and enhancing the dispersibility of inorganic particles. Thus, the inorganic particles can be uniformly dispersed in the resin composition, and the resin composition obtained can have excellent transparency.

In this invention, an organically modified layered silicate is a layered silicate in which the exchangeable cations or anions existing between layers are exchanged by organic onium ions or organic anions. Especially a layered silicate in which exchangeable cations are exchanged by organic onium ions is preferred.

The layered silicate having exchangeable ions between layers has a structure in which 0.05 to 0.5 µm wide and 6 to 15 angstrom thick sheets are laminated, with exchangeable ions kept between the layered sheets. The layered silicate has an ion exchange capacity of 0.2 to 3 meq/g, preferably 0.8 to 1.5 meq/g.

Examples of the layered silicate include smectites clay minerals such as montmorillonite, beidellite, nontronite, saponite, hectorite and sauconite, various clay minerals such as vermiculite, halloysite, canemite, kenyaite, zirconium phosphate and titanium phosphate, swellable micas such as Li-type fluorine taeniolite, Na-type fluorine taeniolite, Na-type tetrasilicon fluorine mica and Li-type tetrasilicon fluorine mica, hydrotalcite, etc. They can be natural or synthetic.

Among them, smectites clay minerals such as montmorillonite and hectorite and swellable synthetic micas such as Na-type tetrasilicon fluorine mica and Li-type fluorine taeniolite are preferred.

Examples of the organic onium ions include ammonium ions, phosphonium ions, sulfonium ions, etc. Among them, ammonium ions and phosphonium ions are preferred. Especially ammonium ions can be preferably used. The ammonium ions can be any of primary ammonium, secondary ammonium, tertiary ammonium and quaternary ammonium.

Examples of the primary ammonium ions include decyl ammonium, dodecyl ammonium, octadecyl ammonium, oleyl ammonium, benzyl ammonium, etc.

Examples of the secondary ammonium ions include methyl dodecyl ammonium, methyl octadecyl ammonium, etc.

Examples of the tertiary ammonium ions include dimethyl dodecyl ammonium, dimethyl octadecyl ammonium, etc.

Examples of the quaternary ammonium ions include benzyltrialkylammonium ions such as benzyltrimethylammonium, benzyltriethylammonium, benzyltributylammonium, benzyldimethyldodecylammonium, benzyldimethyloctadecylammonium and benzalconium, alkyltrimethylammonium ions such as trimethyloctylammonium, trimethyldodecylammonium and trimethyloctadecylammonium, dimethyldialkylammonium ions such as dimethyldioctylammonium, dimethyldidodecylammonium and dimethyldioctadecylammonium, trialkylmethylammonium ions such as trioctylmethylammonium and tridodecylmethylammonium, benzotonium ions with two benzene rings, etc.

In addition, ammonium ions include those derived from aniline, p-phenylenediamine, a-naphthylamine, p-aminodimethylaniline, benzidine, pyridine, piperidine, 6-aminocaproic acid, 11-aminoundecanoic acid, 12-aminododecanoic acid, polyalkylene glycols with amino groups at the ends, etc.

Among these ammonium ions, preferred compounds include trioctylmethylammonium, benzyldimethyldodecylammonium, benzyldimethyloctadecylammonium, benzalconium, etc. These ammonium ions can be generally obtained as mixtures, and each of the aforesaid compound names is the name of a typical compound containing small amounts of analogues. Any one of the compounds can be used alone, or two or more of them can also be used as a mixture.

Further, ammonium ions with a reactive functional group and those having high affinity are preferred. Ammonium ions derived from 12-aminododecanoic acid or those derived from a polyalkylene glycol with amino groups at the ends are also preferred.

The organic anions can be a long-chain carboxylic acid such as lauric acid, decanoic acid, stearic acid, dodecadicarboxylic acid or dimer acid.

In this invention, the organically modified layered silicate can be produced by letting a layered silicate with exchangeable cations or anions between layers and organic onium ions or organic anions react with each other by a publicly known method. Particular methods include a method in which an ion exchange reaction is performed in a polar solvent such as water, methanol or ethanol, and a method in which a liquid or molten organic salt is made to directly react with a layered silicate.

In this invention, the amount of organic ions based on the amount of the layered silicate is usually in a range from 0.4 to 2.0 equivalents based on the cation exchange capacity of the layered silicate in view of the dispersibility of the layered silicate, the thermal stability during melting, the inhibition of gas and offensive odor generation during molding, etc. A preferred range is 0.8 to 1.2 equivalents.

Further, it is preferred that the organically modified layered silicate is preliminarily treated by a coupling agent with a reactive functional group, since more excellent mechanical strength can be obtained. Examples of the coupling agent with a reactive functional group include isocyanate-based compounds, organic silane-based compounds, organic titanate-based compounds, organic borane-based compounds, epoxy compounds, etc.

In this invention, it is preferred that the organically modified layered silicate is uniformly dispersed in the resin composition. In this case, uniform dispersion refers to a state in which the layered silicate is dispersed as laminate blocks each consisting of five or less layers without forming local large blocks.

In this invention, it is preferred that the comprised amount of the inorganic particles (E) is 0.1 to 50 parts by weight per 100 parts by weight in total of the polylactic acid-based resin (A) and the methacrylic resins (B). A more preferred range is 0.5 to 20 parts by weight, and, an especially preferred range is 1 to 10 parts by weight.

The resin composition of this invention can contain a filler (glass fibers, carbon fibers, metal fibers, natural fibers, organic fibers, glass flakes, glass beads, ceramic fibers, ceramic beads, asbestos, wollastonite, talc, clay, mica, sericite, zeolite, bentonite, dolomite, kaolin, fine silicic acid powder, feldspar powder, potassium titanate, Shirasu (white sandy deposit) balloons, calcium carbonate, magnesium carbonate, barium sulfate, calcium oxide, aluminum oxide, titanium oxide, aluminum silicate, silicon oxide, gypsum, novaculite, dawsonite, terra alba, etc.), stabilizer (antioxidant, ultraviolet light absorber, etc.), lubricant, releasing agent, flame retarder, colorant such as dye or pigment, crystal nucleating agent, plasticizer, antistatic agent, etc., to such an extend that the object of this invention is not impaired. Above all, it is preferred to comprise a releasing agent, since a resin composition excellent in mechanical properties, moldability, heat resistance, transparency, etc. can be obtained. As the releasing agent, any releasing agent used for ordinary thermoplastic resins can be used. Examples of the releasing agent include fatty acids, fatty acid metal salts, hydroxy-fatty acids, fatty acid esters, aliphatic partially saponified esters, paraffin, low molecular polyolefins, fatty acid amides, alkylene bis fatty acid amides, aliphatic ketones, fatty acid lower alcohol esters, fatty acid polyhydric alcohol esters, fatty acid polyglycol esters, modified silicones, etc. It is preferred that the comprised amount of the releasing agent is 0.01 to 3 parts by weight per 100 parts by weight in total of the polylactic acid-based resin (A) and the methacrylic resins (B). A more preferred range is 0.03 to 2 parts by weight.

Further, the resin composition used in this invention can be comprised with at least one or more of other thermoplastic resins (for example, polyethylene resin, polypropylene resin, polymethylpentene resin, cyclic olefin-based resins, acrylonitrile-butadiene-styrene (ABS) resin, acrylonitrile-styrene (AS) resin, cellulose-based resins such as cellulose acetate, polyamide resins, polyacetal resins, polyester resins such as polyethylene terephthalate resin and polybutylene terephthalate resin, polycarbonate resins, polyphenylene oxide resin, polyarylate resins, polysulfone resins, polyphenylene sulfide resin, polyether ether ketone resins, polyimide resins, polyether imide resins, etc.) and thermosetting resins (for example, phenol resins, melamine resins, polyester resins, silicone resins, epoxy resins, etc.) to such an extent that the object of this invention is not impaired.

The method for producing the resin composition of this invention is not especially limited. For example, preferred is a method in which the polylactic acid-based resin (A), the methacrylic resins (B) and, as required, other additives are blended beforehand, and melt-kneaded homogeneously by a single screw extruder or double screw extruder at a temperature higher than the melting point, or a method in which mixing in a solution is followed by removal of the solvent used. In view of productivity, a method of using a single screw extruder or double screw extruder for homogeneously melt-kneading is preferred, and a method of using a double screw extruder for homogeneously melt-kneading is more preferred, since a resin composition excellent in transparency, heat resistance and flowability can be obtained.

The resin composition of this invention is characterized in that the ratio of the syndiotacticity to the isotacticity (syndiotacticity/isotacticity) of the methacrylic resins in the resin composition is 2.5 to 8.0. Further, in view of heat resistance and flowability, a more preferred range is 3.0 to 8.0, and a further more preferred range is 3.0 to 5.5. An especially preferred range is 3.0 to 5.0. With regard to the syndiotacticity, heterotacticity and isotacticity, the integrated intensities of the peaks of the backbone methyl groups at 0.9 ppm, 1.0 ppm and 1.2 ppm observed respectively as syndiotacticity, heterotacticity and isotacticity in $^1$H-NMR measurement using deuterated chloroform as the solvent are added to express the total as 100%, and the percentages of the integrated intensities of the respective peaks are obtained as syndiotacticity, heterotacticity and isotacticity.

It is preferred that the resin composition of this invention has a glass transition temperature of 70° C. or higher in view of heat resistance. More preferred is 75° C. or higher, and further more preferred is 80° C. or higher. Especially preferred is 90° C. or higher. The upper limit is not especially limited, but in view of flowability, preferred is 150° C. or lower. More preferred is 120° C. or lower. The glass transition temperature in this specification refers to the value measured using DSC according to the method described in JIS K 7121, and can be either the half point glass transition temperature or the extrapolated end point transition temperature. In DSC measurement, the DSC curve bends due to the change of specific heat capacity, and from the form in which the baselines are displaced in parallel, the glass transition temperature region can be detected. For obtaining the half point glass transition temperature, a tangential line of the baseline below the bending point and a tangential line of the baseline above the bending point are drawn to be parallel to each other, and a straight line is drawn to be parallel to the respective tangential line of the baselines at the position corresponding to half the height between the respective baselines, i.e., half the change of specific heat capacity. The intersection between the straight line and the bending DSC curve is called the half point glass transition temperature. The extrapolated end point transition temperature refers to the intersection between the tangential line of the baseline for the temperatures above the bending point and the tangential line at the point at which the gradient of the bending portion becomes largest.

It is preferred in view of heat resistance that the deflection temperature under load (DTUL) of the resin composition of this invention measured at a load of 0.45 MPa according to ASTM D648 is 60° C. or higher. More preferred is 70° C. or higher, and further more preferred is 80° C. or higher.

It is preferred that the resin composition of this invention is transparent. Being transparent means that a portion of a molded article overlapped on a print having characters printed such as a newspaper allows the characters to be read. Particularly it is preferred that the haze of a 20 μm or thicker, preferably 1 mm thick molded particle is 30% or less. In view of excellent transparency, a haze of 10% or less is more preferred, and a haze of 5% or less is further more preferred. In this invention, a haze refers to the value measured according to JIS K 7105. Further, the transparency can also be judged in reference to the total light transmittance measured according to JIS K 6714. A total light transmittance of 80% or more is preferred, and 85% or more is more preferred. Further more preferred is 90% or more.

The melt flow rate (MFR) of the resin composition of this invention is not especially limited. However, in view of heat resistance, it is preferred that the MFR measured at a load of 21.2N and at 190° C. according to JIS K 7210 is 30 g/10 min or less. More preferred is 20 g/10 min or less, and further more preferred is 15 g/10 min or less. If the MFR is more than 30 g/10 min, the heat resistance tends to decline. In view of flowability, 0.1 g/10 min or more is preferred, and 1 g/10 min or more is more preferred. Further more preferred is 3 g/10 min or more. If the MFR is smaller than 0.1 g/10 min, the flowability declines and the moldability during injection molding tends to decline.

The surface hardness of the resin composition of this invention is not especially limited, but it is preferred that the pencil hardness measured according to JIS K 5600 is HB or higher. More preferred is F or higher, and further more preferred is H or higher. It is not preferred that the pencil hardness is lower than HB, since the surface is likely to be flawed. In the case where the resin composition of this invention is used as an optical recording medium, HB or higher is preferred for such reasons that when the resin composition is formed into a substrate, the substrate is unlikely to be flawed and that read errors and the like are unlikely to occur. More preferred is H or higher. It is preferred that the hardness is 3H or lower, since the optical recording medium is unlikely to be destroyed even if it is subject to dropping impact or the like. More preferred is 2H or lower.

The impact strength of the resin composition of this invention is not especially limited. However, in view of impact resistance, it is preferred that the Izod impact strength measured according to ASTM D256 is 50 J/m or higher. More preferred is 75 J/m or higher, and further more preferred is 100 J/m or higher. It is not preferred that the Izod impact strength is lower than 50 J/m, since the product is likely to be broken when it is subject to dropping impact or the like.

The saturated water absorption coefficient of the resin composition of this invention is not especially limited. However, it is preferred that the saturated water absorption coefficient measured according to ASTM D570 is 0.4 wt % or less. More preferred is 0.3 wt % or less, and further more preferred is 0.2 wt % or less. Especially preferred is 0.1 wt % or less. The lower limit is not especially limited. It is not preferred that the saturated water absorption coefficient is more than 0.4 wt %, since the deformation caused by moisture absorption is likely to occur, increasing the possibility that the product cannot be used.

The retardation (birefringence) of the resin composition of this invention is not especially limited. However, it is preferred that the retardation measured by applying a laser beam of 405 nm to the surface of a substrate at 23° C. and at an angle of 30° using a commercially available ellipsometer is 50 nm or less. More preferred is 30 nm or less, and further more preferred is 20 nm or less. Especially preferred is 10 nm or less, and most preferred is 5 nm or less. In the case where the resin composition of this invention is used as an optical recording medium, it is not preferred that the retardation is more than 50 nm, since read errors and the like are likely to occur.

The resin composition of this invention can be molded into various molded articles by such methods as injection molding and extrusion molding, for use as molded articles.

The molded articles obtained from the resin composition of this invention include injection-molded articles, extrusion-molded articles, blow-molded articles, films, sheets, etc. In this invention, in view of excellent heat resistance, a molded article with a 20 μm or thicker portion is preferred, and a molded article with a 1 mm or thicker portion is more preferred. Further, in view of excellent heat resistance and impact resistance, a molded article with a 50 mm or thinner portion is preferred, and a molded article with a 10 mm or thinner portion is more preferred. A molded article with a 5 mm or thinner portion is further more preferred.

In view of excellent transparency, it is preferred that the molded article obtained from the resin composition of this invention has a 20 or thicker, preferably 1 mm thick portion with a haze of 30% or less. It is more preferred that the molded article has a portion with a haze of 10% or less. It is further more preferred that the molded article has a portion with a haze of 5% or less. In this invention, the haze is a value measured using a haze meter according to JIS K 7105.

The molded articles obtained from the resin composition of this invention can be used in various applications such as electric and electronic parts, architectural members, automobile parts, various containers, daily-used articles, miscellaneous living goods and sanitary articles.

Particularly the molded articles can be used for electric and electronic parts such as relay cases, coil bobbins, optical pickup chassis, motor cases, notebook personal computer housings and internal parts, CRT display housings and internal parts, printer housings and internal parts, cell phones, mobile personal computers, handheld mobile phone and other portable terminal housing and internal parts, recording medium (CD, DVD, PD, FDD, etc.) drive housings and internal parts, copier housings and internal parts, facsimile housings and internal parts, and parabolic antennas. The molded particles can also be used for household and office electric appliance parts such as VTR parts, TV parts, irons, hair dryers, rice boiler parts, microwave oven parts, acoustic parts, parts of image apparatuses including video cameras and projectors, substrates of optical recording media including laser discs (registered trademark), compact discs (CD), CD-ROM, CD-R, CD-RW, DVD-ROM, DVD-R, DVD-RW, DVD-RAM and Blu-ray discs, illumination parts, refrigerator parts, air conditioner parts, typewriter parts and word processor parts. Further, the molded articles can also be used for housings and internal parts of electronic musical instruments, household game machines and portable game machines, electric and electronic parts such as various gears, various cases, sensors, LEP lamps, connectors, sockets, resistors, relay cases, switches, coil bobbins, capacitors, variable capacitor cases, optical pickups, vibrators, various terminal boards, transformers, plugs, printed wiring boards, tuners, speakers, microphones, head phones, small motors, magnetic head bases, power modules, semiconductor parts, liquid crystal parts, FDD carriages, FDD chassis, motor brush holders, transformer members and coil bobbins, architectural members such as sash door wheels, blind curtain parts, pipe joints, curtain liners, blind parts, gas meter parts, water meter parts, water boiler parts, roof panels, heat insulating walls, adjusters, plastic bundles, ceiling suspenders, stairs, doors and floors, fishing-related articles such as fish lines, fishing nets, sea weed culture nets and fish bait bags, civil engineering-related articles such as vegetation nets, vegetation mats, weed-preventing bags, weed-preventing nets, protection sheets, slope protection sheets, dust scattering prevention sheets, drain sheets, water holding sheets, sludge dewatering bags and concrete forms, automobile under-hood parts such as air flow meters, air pumps, thermostat housings, engine mounts, ignition bobbins, ignition cases, clutch bobbins, sensor housings, idle speed control valves, vacuum switching valves, ECU housings, vacuum pump cases, inhibitor switches, revolution sensors, acceleration sensors, distributor caps, coil bases, ABS actuator cases, radiator tank tops and bottoms, cleaning fans, fan shrouds, engine covers, cylinder head covers, oil caps, oil pans, oil filters, fuel caps, fuel strainers, distributor caps, vapor canister housings, air cleaner housings, timing belt covers, brake booster parts, various cases, various tubes, various tanks, various hoses, various clips, various valves and various pipes, automobile interior arts such as torque control levers, safety belt parts, register blades, washer levers, window regulator handles, window regulator handle knobs, passing light levers, sun visor brackets and various motor housings, automobile exterior parts such as roof rails, fenders, garnishes, bumpers, door mirror stays, spoilers, hood louvers, wheel covers, wheel caps, grill apron cover frames, lamp reflectors, lamp vessels and door handles, various automobile connectors such as wire harness connectors, SMJ connectors, PCB connectors and door grommet connectors, machine parts such as gears, screws, springs, bearings, levers, key stems, cams, ratchets, rollers, water supply parts, toy parts, fans, fishing guts, pipes, washing jigs, motor parts, microscopes, binoculars, cameras and timepieces, agricultural articles such as mulching films, tunnel films, bird preventing sheets, vegetation protective nonwoven fabrics, seedling raising pots, vegetation piles, seed cords/tapes, germination sheets, house lining sheets, PVC greenhouse fastener, slow-acting fertilizers, root protecting sheets, horticultural nets, insecticidal nets, seedling nets, print laminates, fertilizer bags, sample bags, sandbags, beast prevention nets, guiding strings and windbreak nets, sanitary articles such as paper diapers, sanitary napkin packing materials, cotton swabs, rolled wet towels and stool dust cloths, medical articles such as medical nonwoven fabrics (suture reinforcing materials, adhesion preventing films and artificial organ repairing materials), wound covering materials, wound bandages, adhesive plaster foundation cloths, surgical sutures, fracture reinforcing materials and medical films, packaging films of calendars, stationery, clothing, foods, etc., containers and tableware such as trays, blisters, knives, forks, spoons, tubes, plastic cans, pouches, containers, tanks, baskets, etc., containers and packages such as hot fill containers, microwave oven cooking containers, cosmetic containers, wraps, foam cushioning materials, paper laminates, shampoo bottles, drinking bottles, cups, candy packages, shrink labels, lid materials, envelopes with a transparent window, fruit baskets, hand tearable tapes, easy peel packages, egg packs, HDD packages, compost bags, recording medium packages, shopping bags, and wrapping films of electric and electronic parts, etc., various clothing such as natural fiber composites, polo shirts, T shirts, inner garments, uniforms, sweaters, socks and neckties, interior articles such as curtains, chair covering cloths, carpets, table cloths, beddings, wallpapers and wrapping cloths, hot melt binders for carrier tapes, print laminates, heat sensitive stencil printing films, releasing films, porous films, container bags, credit cards, cash cards, ID cards, IC cards, paper, leather, nonwoven fabrics, etc., binders for powders of magnetic materials, zinc sulfide, electrode materials, etc., optical elements, conductive embossed tapes, IC trays, golf tees, garbage bags, plastic shopping bags, various nets, toothbrushes, stationery, water draining nets, body towels, hand towels, tea packs, drain ditch filters, clear files, coating materials, adhesives, bags, chairs, tables, cooler boxes, rakes, hose reels, planters, hose nozzles, dining tables, desk surfaces, furniture panels, kitchen cabinets, pen caps, gas lighters, etc.

Especially the resin composition of this invention is useful as substrates of optical recording media such as CD, CD-ROM, CD-R, CD-RW, DVD-ROM, DVD-R, DVD-RW, DVD-RAM, laser discs (registered trademark) and Blu-ray discs.

In this invention, the method for producing the substrates of optical recording media is not especially limited, and a publicly known method can be used. For example, an injection molding method, extrusion molding method, injection press molding method, etc. can be used. An injection molding method is preferred, since substrates with good properties can be produced stably in a large quantity. Further, various layers such as a reflection layer, recording layer, adhesive layer, dielectric layer and protective layer formed on the substrate can be formed by publicly known methods. Meanwhile, as the adhesive used for the adhesive layer, it is preferred to use a highly heat resistant adhesive such as a polyimide-based adhesive in view of heat resistance. Further, by changing the types and number of the layers formed on the substrate, read only discs, recordable discs, rewritable discs, etc. can be produced respectively.

In this invention, the strength of an optical recording medium refers to the breaking strength of the optical recording medium, namely, the resistance of the optical recording medium against fracture. In this invention, an end of an optical recording medium is fixed by a vice or the like, and in this state, the other end is held by hand and bent to an angle at which the optical recording medium is broken. The strength can be judged in reference to the angle. If the angle is 15 degrees or more, it can be considered that the optical recording medium is unlikely to be broken. An angle of 20 degrees or more is a preferred strength, and an angle of 30 degrees or more is a more preferred higher strength.

The resin composition of this invention and the molded article made thereof can be recycled. For example, the resin composition and the molded article made thereof can be heat-treated at 80° C. or higher, preferably 100° C. or higher and ground into a fine powder. Then, a solvent such as acetone or tetrahydrofuran can be used to isolate the methacrylic resins (B), and subsequently a solvent such as chloroform can be used to isolate the polylactic acid-based resin (A) from the residue. The isolated resins can be used respectively alone, and if they are mixed with each other, the resin composition obtained can be used like the resin composition of this invention and can also be formed into a molded article.

EXAMPLES

The constitution and effects of this invention are described below in more detail in reference to examples. In the following examples, the respectively comprised amounts are expressed in parts by weight. The raw materials used and the symbols in the tables are shown below.
(A) Polylactic Acid-Based Resins
(A-1) Poly-L-lactic acid resin (D-isomer content 1.2%, weight average molecular weight 120,000)
(A-2) Poly-L-lactic acid resin (D-isomer content 1.2%, weight average molecular weight 150,000)
(A-3) Poly-L-lactic acid resin (D-isomer content 1.2%, weight average molecular weight 210,000)
(B) Methacrylic Resins
(B-1) Methacrylic resin {"SUMIPEX" LG21 produced by Sumitomo Chemical, weight average molecular weight 80,000, glass transition temperature 105° C., syndiotacticity 41%, MFR 21 g/10 min (230° C., 37.2N)}
(B-2) Methacrylic resin {"PARAPET" HR-L produced by Kuraray, weight average molecular weight 90,000, glass transition temperature 117° C., syndiotacticity 56%, MFR 2 g/10 min (230° C., 37.2N)} (B-3) Methacrylic resin ("SUMIPEX" LG35 produced by Sumitomo Chemical, weight average molecular weight 100,000, glass transition temperature 90° C., syndiotacticity 39%, MFR 35 g/10 min (230° C., 37.2N))
(C) Multilayer Structure Polymers Respectively Formed as Particles Each Consisting of a Core and One or More Shell Layers Covering it
(C-1) The polymer obtained by Production Example 1
(C-2) The polymer obtained by Production Example 2
(C-3) "PARAFACE" ME-120 produced by Kuraray (core . . . acrylic polymer, shell . . . methyl methacrylate copolymer, refractive index 1.468, glass transition temperature of rubber layer −50° C.)
(C-4) "METABLEN" 52001 produced by Mitsubishi Rayon (core silicone/acrylic polymer, shell . . . methyl methacrylate polymer, refractive index 1.448)
(C-5) "KANE ACE" M511 produced by Kaneka (core . . . butadiene/styrene polymer, shell . . . methyl methacrylate polymer, refractive index 1.518, glass transition temperature of rubber layer −100° C.)
(D) Reactive Compounds
(D-1) Glycidyl group-containing acrylic/styrene-based copolymer ("ARUFON" UG4040 produced by Toagosei, weight average molecular weight 10,000)
(D-2) Glycidyl group-containing acrylic copolymer ("MAR-PROOF" G2050M, produced by NOF, weight average molecular weight 210,000)
(D-3) Oxazoline group-containing styrene-based polymer ("EPOCROS" RPS-1000 produced by Nippon Shokubai, weight average molecular weight 140,000)
(D-4) Terephthalic acid diglycidyl ester ("DENACOL" EL-711 produced by Nagase ChemteX, weight average molecular weight 260)
(D-5) Polycarbodiimide ("CARBODILITE" HMV-8CA produced by Nisshinbo, weight average molecular weight 2,000)
(E) Inorganic Particles
(E-1) Montmorillonite exchanged by 12-aminonodecanoic acid hydrochloride obtained in Production Example 3 (organically modified layered silicate)
(E-2) Colloidal silica ("OSCAL" produced by Catalysts & Chemicals Industries)

Production Example 1

(C-1) Production Example

A reaction vessel with a reflux condenser was charged with 120 parts by weight of deionized water, 0.2 part by weight of potassium carbonate, 0.2 part by weight of dioctyl sulfosuccinate and 0.005 part by weight of potassium persulfate, and after the mixture was stirred in nitrogen atmosphere, another mixture consisting of 56 parts by weight of butyl acrylate, 12 parts by weight of methyl methacrylate and 1 part by weight of allyl methacrylate was added continuously, taking 60 minutes. Then the mixture was kept at 70° C. for 30 minutes, to obtain a core layer polymer. Subsequently 0.005 part by weight of potassium persulfate was added, and a mixture consisting of 19 parts by weight of methyl methacrylate and 10 parts by weight of methyl acrylate was added continuously, taking 60 minutes. The mixture was kept at 70° C. for 60 minutes, to polymerize a shell layer (second layer). The latex was solidified by sulfuric acid and neutralized by caustic soda. Then, washing with water of 50° C. and dewatering were repeated three times. The solid content was dried at 80° C. for 12 hours, to obtain a powder of a two-layer structure polymer (C-1). The refractive index of C-1 was 1.472, and the glass transition temperature of the rubber layer was −30° C.

Production Example 2

(C-2) Production Example

A reaction vessel with a reflux condenser was charged with 300 parts by weight of deionized water, 1.0 part by weight of sodium stearate and 0.1 part by weight of sodium N-lauroyl sarcosinate, and after the mixture was stirred at 70° C. for 30 minutes, 0.01 part by weight of potassium persulfate was added. After the mixture was stirred in nitrogen atmosphere, another mixture consisting of 50 parts by weight of methyl methacrylate, 2 parts by weight of methyl acrylate and 0.15 part by weight of allyl methacrylate was added continuously, taking 60 minutes, and the mixture was kept at 80° C. for 60 minutes, to obtain a core layer polymer. Then, 0.01 part by weight of potassium persulfate was added, and subsequently a mixture consisting of 58 parts by weight of butyl acrylate, 12 parts by weight of styrene and 1 part by weight of allyl methacrylate was added continuously, taking 60 minutes. The mixture was kept at 70° C. for 30 minutes, to polymerize a shell layer (second layer). Further, 0.01 part by weight of potassium persulfate was added, and a mixture consisting of 29 parts by weight of methyl methacrylate and 1 part by weight of methyl acrylate was added continuously, taking 60 minutes. The mixture was kept at 70° C. for 60 minutes, to polymerize a shell layer (third layer). The latex was solidified by sulfuric acid and neutralized by caustic soda, and washing with water of 50° C. and dewatering were repeated three times. The solid content was dried at 80° C. for 12 hours, to obtain a powder of a three-layer structure polymer (C-2). The refractive index of C-2 was 1.485, and the glass transition temperature of the rubber layer was −34° C.

Production Example 3

(E-1) Production Example

One hundred grams of Na-type montmorillonite ("Kunipia F" produced by Kunimine Industries, cation exchange capacity 120 m equivalents/100 g) was dispersed into 10 liters of hot water with stirring, and 2 liters of hot water with 30.2 g of 12-aminododecanoic acid hydrochloride (equivalent to the cation exchange capacity) dissolved was added. The mixture was stirred for 1 hour, and the generated precipitate was filtered away. The precipitate was washed with hot water three times, and the obtained solid was dried at 80° C. in vacuum, to obtain E-1.

The measuring methods and judging methods used in this invention are described below.

(1) Weight Average Molecular Weight (Mw)

The weight average molecular weight was a value as standard PMMA measured by gel permeation chromatography (GPC). Hexafluoroisopropanol was used as the solvent, and the flow velocity was 0.5 mL/min. Zero point one milliliter of a solution with a sample concentration of 1 mg/mL was injected for measurement.

(2) Syndiotacticity and Isotacticity

The respective values were measured by $^1$H-NMR measurement. For $^1$H-NMR measurement, JNM-AL400 produced by JEOL Ltd. was used for measurement with a sample concentration of 20 mg/mL using deuterated chlorofotiu as the solvent. The integrated intensities of the peaks of the backbone methyl groups at 0.9 ppm, 1.0 ppm and 1.2 ppm observed respectively as syndiotacticity, heterotacticity and isotacticity were added to express the total as 100%, and the percentages of the integrated intensities of the respective peaks were obtained as syndiotacticity, heterotacticity and isotacticity.

(3) Glass Transition Temperature (Tg)

The glass transition temperature was measured according to JIS K 7121 using a differential scanning calorimeter (RDC220 produced by Seiko Denshi). Measuring conditions: 10 mg sample, nitrogen atmosphere and heating rate 20° C./min.

(4) Heat Resistance (DTUL)

The deflection temperature under load (at a load of 0.45 MPa) of a molded article of 12.7 mm×127 mm×3 mm was measured according to ASTM D648.

(5) Transparency

Haze meter NDH-300A produced by Nippon Denshoku Kogyo was used to measure the haze of a molded sheet of 5 cm×5 cm×1 mm according to JIS K 7105.

(6) Flowability (MFR)

The flowability of a resin composition was measured at 190° C. and at a load of 21.2N according to JIS K 7210.

(7) Tensile Strength

A molded ASTM No. 1 dumbbell was used to perform a tensile test according to ASTM D638.

(8) Pencil Hardness

The pencil hardness of a molded sheet of 5 cm×5 cm×1 mm was measured according to JIS K 5600-5-4.

(9) Impact Property

The Izod impact strength of a 3 mm thick molded strip with a notch was measured according to ASTM D 256.

(10) Refractive Index

A resin composition or a multilayer structure polymer formed as particles each consisting of a core layer and one or more shell layers covering it (C) was molded by a press at 150° C., to form a 0.5 mm thick sheet, and a specimen with a size of 5 mm width and 20 mm length was cut out. An Abbe's refractometer (DR-M2 produced by Atago) was used to measure the refractive index at 23° C. and at a wavelength of 589 nm.

(11) Dispersion State of a Multilayer Structure Polymer Formed as Particles Each Consisting of a Core Layer and One or More Shell Layers Covering it (C) in a Resin Composition A transmission electron microscope (TEM) was used to observe at a 20,000-fold magnification. The primary particle sizes of given 100 dispersed particles were measured and averaged to obtain an average dispersed particle size. For obtaining the ratio (l/m) of the number of agglomerated particles (l) to the number of non-agglomerated particles (m) of the multilayer structure polymer formed as particles each consisting of a core layer and one or more shell layers covering it, a transmission electron microscope was used to observe at a 20,000-fold magnification. Among given 100 particles dispersed as the multilayer structure polymer formed as particles each consisting of a core layer and one or more shell layers covering it (C), the particles kept in contact with each other were judged to be agglomerated particles, to obtain l/m. In this case, the central portion of a molded article of 12.7 mm×127 mm×3 mm was observed.

(12) Dispersion State of Inorganic Particles (E) in a Resin Composition

A transmission electron microscope (TEM)—energy dispersive X-ray analyzer (EDX) was used to observe at a 20,000-fold magnification, and the lengths of minor axes of given 20 particles judged to be silicon-containing particles by EDX and the lengths of major axes of those particles were measured and averaged.

(13) Hydrolysis Resistance

A molded ASTM No. 1 dumbbell was treated in a thermo-hygrostat of 70° C. and 95% relative humidity for 100 hours, and the tensile strength was measured to obtain the tensile strength retention. A larger tensile strength retention means more excellent hydrolysis resistance.

Examples 1 to 5 and Comparative Examples 1 to 8

As shown in Tables 1 and 2, a polylactic acid-based resin and methacrylic resins were mixed and melt-kneaded using a double screw extruder with a diameter of 30 mm at a cylinder temperature of 200° C. at a speed of 200 rpm, to obtain a resin composition as pellets.

The obtained resin composition was injection-molded using an injection molding machine, SG75H-MIV produced by Sumitomo Heavy Industries at a cylinder temperature of 200° C. and a mold temperature of 40° C., to obtain 3 mm thick molded articles with a notch, molded 12.7 mm×127 mm×3 mm articles, molded 3 mm thick ASTM No. 1 dumbbells and molded 5 cm×5 cm×1 mm sheets.

The obtained molded articles were used to perform respective evaluations. The results are shown in Tables 1 and 2.

TABLE 1

| | | | Example | | | | |
|---|---|---|---|---|---|---|---|
| | | | 1 | 2 | 3 | 4 | 5 |
| (A) Polylactic acid-based resin | Kind | | A-1 | A-1 | A-1 | A-2 | A-3 |
| | Amount | Parts by weight | 50 | 50 | 50 | 50 | 50 |
| (B) Methacrylic resin 1 | Kind | | B-1 | B-2 | B-2 | B-2 | B-2 |
| | Amount | Parts by weight | 35 | 35 | 25 | 25 | 25 |
| (B) Methacrylic resin 2 | Kind | | B-3 | B-3 | B-3 | B-3 | B-3 |
| | Amount | Parts by weight | 15 | 15 | 25 | 25 | 25 |
| Properties of methacrylic resins | Difference of Tg | ° C. | 15 | 27 | 27 | 27 | 27 |
| | Difference of syndiotacticity | % | 2 | 17 | 17 | 17 | 17 |
| Syndiotacticity/isotacticity of methacrylic resins in resin composition | | | 2.6 | 5.1 | 3.9 | 3.9 | 3.9 |
| Heat resistance (Tg) | Half point glass transition temperature | ° C. | 72 | 75 | 77 | 78 | 78 |
| | Extrapolated end point transition temperature | ° C. | 81 | 86 | 91 | 94 | 96 |
| Transparency | Haze | % | 2 | 2 | 2 | 2 | 2 |
| Flowability | MFR | g/10 min | 10 | 10 | 12 | 6 | 1 |
| Tensile strength | | MPa | 73 | 81 | 72 | 81 | 80 |
| Pencil hardness | | | HB | HB | HB | HB | HB |

(A) Polylactic acid-based resin
(A-1) Poly-L-lactic acid resin (D isomer 1.2%, Mw 120,000)
(A-2) Poly-L-lactic acid resin (D isomer 1.2%, Mw 150,000)
(A-3) Poly-L-lactic acid resin (D isomer 1.2%, Mw 210,000)
(B) Methacrylic resins
(B-1) Methacrylic resin {"Sumipex" LG21 produced by Sumitomo Chemical, Mw 80,000, Tg 105° C., syndiotacticity 41%, MFR 21 g/10 min (230° C., 37.2 N)}
(B-2) Methacrylic resin ("Parapet" HR-L produced by Kuraray, Mw 90,000, Tg 117° C., syndiotacticity 56%, MFR 2 g/10 min (230° C., 37.2 N)}
(B-3) Methacrylic resin {"Sumipex" LG35 produced by Sumitomo Chemical, Mw 100,000, Tg 90° C., syndiotacticity 39%, MFR 35 g/10 min (230° C., 37.2 N)}

TABLE 2

| | | | Comparative Example | | | | | | | |
|---|---|---|---|---|---|---|---|---|---|---|
| | | | 1 | 2 | 3 | 4 | 5 | 6 | 7 | 8 |
| (A) Polylactic acid-based resin | Kind | | A-1 | A-2 | A-3 | A-1 | A-1 | A-1 | A-2 | A-2 |
| | Amount | Parts by weight | 100 | 100 | 100 | 50 | 50 | 50 | 50 | 50 |
| (B) Methacrylic resin 1 | Kind | | — | — | — | B-1 | B-2 | B-3 | B-2 | B-3 |
| | Amount | Parts by weight | 0 | 0 | 0 | 50 | 50 | 50 | 50 | 50 |
| (B) Methacrylic resin 2 | Kind | | — | — | — | — | — | — | — | — |
| | Amount | Parts by weight | 0 | 0 | 0 | 0 | 0 | 0 | 0 | 0 |
| Properties of methacrylic resins | Difference of Tg | ° C. | — | — | — | — | — | — | — | — |
| | Difference of syndiotacticity | % | — | — | — | — | — | — | — | — |
| Syndiotacticity/isotacticity of methacrylic resins in resin composition | | | — | — | — | 2.7 | 8.1 | 2.3 | 8.1 | 2.3 |
| Heat resistance (Tg) | Half point glass transition temperature | ° C. | 59 | 60 | 60 | 70 | 72 | 64 | 72 | 65 |
| | Extrapolated end point transition temperature | ° C. | 61 | 62 | 62 | 76 | 77 | 69 | 78 | 70 |
| Transparency | Haze | % | 2 | 2 | 2 | 2 | 2 | 2 | 2 | 2 |
| Flowability | MFR | g/10 min | 20 | 12 | 2 | 9 | 8 | 19 | 4 | 12 |
| Tensile strength | | MPa | 68 | 70 | 70 | 75 | 79 | 67 | 80 | 72 |
| Pencil hardness | | | 2B | 2B | 2B | HB | HB | HB | HB | HB |

(A) Polylactic acid-based resin
(A-1) Poly-L-lactic acid resin (D isomer 1.2%, Mw 120,000)
(A-2) Poly-L-lactic acid resin (D isomer 1.2%, Mw 150,000)
(A-3) Poly-L-lactic acid resin (D isomer 1.2%, Mw 210,000)
(B) Methacrylic resins
(B-1) Methacrylic resin {"Sumipex" LG21 produced by Sumitomo Chemical, Mw 80,000, Tg 105° C., syndiotacticity 41%, MFR 21 g/10 min (230° C., 37.2 N)}
(B-2) Methacrylic resin {"Parapet" HR-L produced by Kuraray, Mw 90,000, Tg 117° C., syndiotacticity 56%, MFR 2 g/10 min (230° C., 37.2 N)}
(B-3) Methacrylic resin {"Sumipex" LG35 produced by Sumitomo Chemical, Mw 100,000, Tg 90° C., syndiotacticity 39%, MFR 35 g/10 min (230° C., 37.2 N)}

From the results of Tables 1 and 2, the following can be seen.

From the comparison between Examples 1 to 5 and Comparative Examples 1 to 8, it can be seen that a resin composition consisting of a polylactic acid-based resin and two methacrylic resins satisfying the condition of having a difference of 10° C. or more in glass transition temperature and/or the condition of having a difference of 3% or more in syndiotacticity is excellent in heat resistance, transparency, flowability, strength and pencil hardness.

Examples 6 to 14 and Comparative Examples 9 to 12

Resin compositions and molded articles were obtained as described for Example 1, except that a polylactic acid-based resin, methacrylic resins and a multilayer structure polymer were mixed as shown in Tables 3 and 4. The results of respective evaluations are shown in Tables 3 and 4.

TABLE 3

| | | | Example | | | | | | | | | |
|---|---|---|---|---|---|---|---|---|---|---|---|---|
| | | | 6 | 7 | 8 | 9 | 10 | 11 | 12 | 13 | 14 |
| (A) Polylactic acid-based resin | Kind | | A-2 | A-2 | A-2 | A-1 | A-2 | A-2 | A-2 | A-2 | A-2 |
| | Amount | Parts by weight | 50 | 50 | 50 | 50 | 50 | 50 | 50 | 50 | 50 |
| (B) Methacrylic resin 1 | Kind | | B-1 | B-2 | B-2 | B-2 | B-2 | B-2 | B-2 | B-2 | B-2 |
| | Amount | Parts by weight | 25 | 35 | 25 | 25 | 25 | 25 | 25 | 25 | 25 |
| (B) Methacrylic resin 2 | Kind | | B-3 | B-3 | B-3 | B-3 | B-3 | B-3 | B-3 | B-3 | B-3 |
| | Amount | Parts by weight | 25 | 15 | 25 | 25 | 25 | 25 | 25 | 25 | 25 |
| (C) Multilayer structure polymer | Kind | | C-1 | C-1 | C-1 | C-1 | C-1 | C-2 | C-3 | C-4 | C-5 |
| | Amount | Parts by weight | 15 | 15 | 15 | 25 | 25 | 25 | 25 | 25 | 25 |
| Properties of methacrylic resins | Difference of Tg | ° C. | 15 | 27 | 27 | 27 | 27 | 27 | 27 | 27 | 27 |
| | Difference of syndiotacticity | % | 2 | 17 | 17 | 17 | 17 | 17 | 17 | 17 | 17 |
| Syndiotacticity/isotacticity of methacrylic resins in resin composition | | | 2.5 | 5.1 | 3.9 | 3.9 | 3.9 | 3.9 | 3.9 | 3.9 | 3.9 |
| Heat resistance (Tg) | Half point glass transition temperature | ° C. | 74 | 75 | 77 | 75 | 76 | 76 | 75 | 75 | 76 |
| | Extrapolated end point transition temperature | ° C. | 83 | 86 | 91 | 85 | 90 | 91 | 90 | 90 | 91 |
| Heat resistance | DTUL | ° C. | 63 | 67 | 70 | 60 | 63 | 66 | 63 | 64 | 62 |
| Transpararicy | Haze | % | 10 | 9 | 9 | 14 | 14 | 12 | 9 | 27 | 39 |
| Flowability | MFR | g/10 min | 11 | 4 | 5 | 10 | 4 | 5 | 5 | 5 | 5 |
| Impact resistance | | J/m | 70 | 72 | 77 | 52 | 135 | 176 | 204 | 120 | 115 |
| Tensile strength | | MPa | 61 | 62 | 65 | 50 | 51 | 51 | 52 | 51 | 48 |
| Dispersion state of multilayer structure polymer | Dispersed particle diameter | nm | 350 | 350 | 350 | 350 | 350 | 280 | 190 | 170 | 250 |
| | l/m*1 | | 0.7 | 0.6 | 0.6 | 0.7 | 0.7 | 0.5 | 0.5 | 0.8 | 0.9 |

*1. Ratio of the number of applomerated particles (l) to the number of non-agglomerated particles (m) of multilayer structure polymer
(A) Polylactic acid-based resin
(A-1) Poly-L-lactic acid resin (D isomer 1.2%, Mw 120,000)
(A-2) Poly-L-lactic acid resin (D isomer 1.2%, Mw 150,000)
(B) Methacrylic resins
(B-1) Methacrylic resin {"Sumipex" LG21 produced by Sumitomo Chemical, Mw 80,000, Tg 105° C., syndiotacticity 41%, MFR 21 g/10 min (230° C., 37.2 N)}
(B-2) Methacrylic resin {"Parapet" HR-L produced by Kuraray, Mw 90,000, Tg 117° C., syndiotacticity 56%, MFR 2 g/10 min (230° C., 37.2 N)}
(B-3) Methacrylic resin {"Sumipex" LG35 produced by Sumitomo Chemical, Mw 100,000, Tg 90° C., syndiotacticity 39%, MFR 35 g/10 min (230° C., 37.2 N)}
(C) Multilayer structure polymers respectively formed as particles each consisting of a core layer and one or more shell layers covering it
(C-1) Polymer produced in Production Example 1 (core . . . butyl acrylate/methyl methacrylate copolymer, shell . . . methyl acrylate/methyl methacrylate copolymer, refractive index 1.472, Tg of rubber layer −30° C.)
(C-2) Polymer produced in Production Example 2 (core . . . methyl acrylate/methyl methacrylate copolymer, shell . . . methly actylate/methyl methaxrylate copolymer, refractive index 1.485, Tg of rubber layer −34° C.)
(C-3) "Paraface" ME-120 produced by Kuraray (core . . . acrylic polymer, shell . . . methyl methacrylate copolymer, refractive index 1.468, Tg of rubber layer −50° C.)
(C-4) "Metablen" S2001 produced by Mitsubishi Rayon (core . . . silicone/acrylic polymer, shell . . . methyl methacrylate polymer, refractive index 1.448)
(C-5) "Kane Ace" M511 produced by Kaneka (core . . . butadiene/styrene polymer, shell . . . methyl methacrylate polymer, refractive index 1.581, Tg of rubber layer -

TABLE 4

| | | | Comparative Example | | | |
|---|---|---|---|---|---|---|
| | | | 9 | 10 | 11 | 12 |
| (A) Polylactic acid-based resin | Kind | | A-2 | — | A-2 | A-2 |
| | Amount | Parts by weight | 100 | 0 | 50 | 50 |
| (B) Methacrylic resin 1 | Kind | | — | B-2 | B-2 | B-3 |
| | Amount | Parts by weight | 0 | 100 | 50 | 50 |
| (B) Methacrylic resin 2 | Kind | | — | — | — | — |
| | Amount | Parts by weight | 0 | 0 | 0 | 0 |
| (C) Multilayer structure polymer | Kind | | C-1 | C-1 | C-1 | C-1 |
| | Amount | Parts by weight | 25 | 25 | 25 | 25 |
| Properties of methacrylic resins | Difference of Tg | ° C. | — | — | — | — |
| | Difference of syndiotacticity | % | — | — | — | — |
| Syndiotacticity/isotacticity of methacrylic resins in resin composition | | | — | 8.1 | 8.1 | 2.3 |

TABLE 4-continued

|  |  |  | Comparative Example | | | |
|---|---|---|---|---|---|---|
|  |  |  | 9 | 10 | 11 | 12 |
| Heat resistance (Tg) | Half point glass transition temperature | ° C. | 60 | 117 | 72 | 65 |
|  | Extrapolated end point transition temperature | ° C. | 62 | 120 | 77 | 70 |
| Heat resistance | DTUL | ° C. | 51 | 91 | 60 | 55 |
| Transparency | Haze | % | 12 | 19 | 15 | 14 |
| Flowability | MFR | g/10 min | 11 | 1 | 3 | 10 |
| Impact resistance |  | J/m | 180 | 105 | 135 | 130 |
| Tensile strength |  | MPa | 45 | 52 | 53 | 49 |
| Dispersion state of multilayer structure polymer | Dispersed particle diameter | nm | 350 | 350 | 350 | 350 |
|  | l/m*1 |  | 1.0 | 0.8 | 0.7 | 0.7 |

*1. Ratio of the number of agglomerated particles (l) to the number of non-agglomerated particles (m) of multilayer structure polymer
(A) Polylactic acid-based resin
(A-2) Poly-L-lactic acid resin (D isomer 1.2%, Mw 150,000)
(B) Methacrylic resins
(B-2) Methacrylic resin {"Parapet" HR-L produced by Kuraray, Mw 90,000, Tg 117° C., syndiotacticity 56%, MFR 2 g/10 min (230° C., 37.2 N)}
(B-3) Methacrylic resin {"Sumipex" LG35 produced by Sumitomo Chemical, Mw 100,000, Tg 90° C., syndiotacticity 39%, MFR 35 g/10 min (230° C., 37.2 N)}
(C) Multilayer structure polymers respectively formed as particles each consisting of a core layer and one or more shell layers covering it
(C-1) Polymer produced in Production Example 1 (core . . . butyl acrylate/methyl methacrylate copolymer, shell . . . methyl acrylate/methyl methacrylate copolymer, refractive index 1.472, Tg of rubber layer −30° C.)

From the results of Tables 3 and 4, the following can be seen.

From the comparison between Examples 6 to 14 and Comparative Examples 9 to 12, it can be seen that a resin composition obtained by mixing a polylactic acid-based resin, methacrylic resins and a multilayer structure polymer is excellent in heat resistance, transparency, flowability, impact resistance and strength. Especially when the multilayer structure polymer used has a refractive index of 1.45 to 1.50 or contains a component with a glass transition temperature of 30° C. or lower, the obtained resin composition is excellent in heat resistance, transparency and impact resistance.

Examples 15 to 23 and Comparative Examples 13 to 17

Resin compositions and molded articles were obtained as described for Example 1, except that a polylactic acid-based resin, methacrylic resins, a reactive compound and/or a multilayer structure polymer were mixed as shown in Tables 5 and 6. The results of respective evaluations are shown in Tables 5 and 6.

TABLE 5

|  |  |  | Example | | | | | | | | |
|---|---|---|---|---|---|---|---|---|---|---|---|
|  |  |  | 15 | 16 | 17 | 18 | 19 | 20 | 21 | 22 | 23 |
| (A) Polylactic acid-based resin | Kind |  | A-2 | A-2 | A-2 | A-2 | A-2 | A-2 | A-2 | A-2 | A-2 |
|  | Amount | Parts by weight | 50 | 50 | 50 | 50 | 50 | 50 | 50 | 50 | 50 |
| (B) Methacrylic resin 1 | Kind |  | B-2 | B-2 | B-2 | B-2 | B-2 | B-2 | B-2 | B-2 | B-2 |
|  | Amount | Parts by weight | 25 | 25 | 25 | 25 | 25 | 25 | 25 | 25 | 25 |
| (B) Methacrylic resin 2 | Kind |  | B-3 | B-3 | B-3 | B-3 | B-3 | B-3 | B-3 | B-3 | B-3 |
|  | Amount | Parts by weight | 25 | 25 | 25 | 25 | 25 | 25 | 25 | 25 | 25 |
| (C) Multilayer structure polymer | Kind |  | — | — | — | C-1 | C-1 | C-1 | C-1 | C-1 | C-3 |
|  | Amount | Parts by weight | 0 | 0 | 0 | 15 | 15 | 15 | 15 | 15 | 25 |
| (D) Reactive compound | Kind |  | D-1 | D-4 | D-5 | D-1 | D-2 | D-3 | D-4 | D-5 | D-1 |
|  | Amount | Parts by weight | 0.5 | 0.5 | 0.5 | 0.5 | 0.5 | 0.5 | 0.5 | 0.5 | 0.5 |
| Properties of methacrylic resins | Difference of Tg | ° C. | 27 | 27 | 27 | 27 | 27 | 27 | 27 | 27 | 27 |
|  | Difference of syndiotacticity | % | 17 | 17 | 17 | 17 | 17 | 17 | 17 | 17 | 17 |
| Syndiotacticity/isotacticity of methacrylic resins in resin composition |  |  | 3.9 | 3.9 | 3.9 | 3.9 | 3.9 | 3.9 | 3.9 | 3.9 | 3.9 |
| Heat resistance (Tg) | Half point glass transition temperature | ° C. | 79 | 77 | 79 | 78 | 78 | 79 | 78 | 78 | 75 |
|  | Extrapolated end point transition temperature | ° C. | 100 | 94 | 95 | 99 | 99 | 95 | 95 | 95 | 90 |
| Heat resistance | DTUL | ° C. | 74 | 71 | 73 | 72 | 72 | 70 | 70 | 71 | 63 |
| Transparency | Haze | % | 1 | 4 | 3 | 6 | 6 | 11 | 12 | 8 | 9 |
| Flowability | MFR | g/10 min | 5 | 5 | 5 | 4 | 4 | 4 | 4 | 4 | 4 |
| Impact resistance |  | J/m | 29 | 25 | 25 | 150 | 143 | 90 | 75 | 85 | 375 |
| Tensile strength |  | MPa | 80 | 81 | 80 | 60 | 60 | 61 | 61 | 60 | 52 |
| Dispersion state of multilayer | Dispersed particle diameter | nm | — | — | — | 350 | 350 | 350 | 350 | 350 | 190 |

TABLE 5-continued

|  |  |  | Example |  |  |  |  |  |  |  |  |
|---|---|---|---|---|---|---|---|---|---|---|---|
|  |  |  | 15 | 16 | 17 | 18 | 19 | 20 | 21 | 22 | 23 |
| structure polymer | l/m*1 |  | — | — | — | 0.4 | 0.4 | 0.6 | 0.6 | 0.5 | 0.3 |
| Hydrolysis resistance |  | % | 43 | 20 | 46 | 41 | 42 | 32 | 19 | 45 | 45 |

*1. Ratio of the number of agglomerated particles (l) to the number of non-agglomerated particles (m) of multilayer structure polymer
(A) Polylactic acid-based resin
(A-2) Poly-L-lactic acid resin (D isomer 1.2%, Mw 150,000)
(B) Methacrylic resins
(B-2) Methacrylic resin {"Parapet" HR-L produced by Kuraray, Mw 90,000, Tg 117° C., syndiotacticity 56%, MFR 2 g/10 min (230° C., 37.2N)}
(B-3) Methacrylic resin {"Sumipex" LG35 produced by Sumitomo Chemical, Mw 100,000, Tg 90° C., syndiotacticity 39%, MFR 35 g/10 min (230° C., 37.2 N)}
(C) Multilayer structure polymers respectively formed as particles each consisting of a core layer and one or more shell layers covering it
(C-1) Polymer produced in Production Example 1 (core . . . butyl acrylate/methyl methacrylate copolymer, shell . . . methyl acrylate/methyl methacrylate copolymer, refractive index 1.472, Tg of rubber layer −30° C.)
(D) Reactive compounds
(D-1) Glycidyl group-containing acrylic/styrene-based copolymer ("ARUFON" UG4040 produced by Toagosei, weight average molecular weight 10,000)
(D-2) Glycidyl group-containing acrylic copolymer ("Marproof" G2050M produced by NOF, weight average molecular weight 210,000)
(D-3) Oxazoline group-containing styrene-based polymer ("Epocros" RPS-1000 produced by Nippon Shokubai, weight average molecular weight 140,000)
(D-4) Terephthalic acid diglycidyl ester ("Denacol" EX-711 produced by Nagase ChemteX, weight average molecular weight 260)
(D-5) Polycarbodiimide ("Carbodilite" HMV-8CA produced by Nisshinbo, weight average molecular weight 2,000)

TABLE 6

|  |  |  | Comparative Example |  |  |  |  |
|---|---|---|---|---|---|---|---|
|  |  |  | 13 | 14 | 15 | 16 | 17 |
| (A) Polylactic acid-based resin | Kind |  | A-2 | — | A-2 | A-2 | A-2 |
|  | Amount | Parts by weight | 100 | 0 | 50 | 50 | 50 |
| (B) Methacrylic resin 1 | Kind |  | — | B-2 | B-2 | B-2 | B-2 |
|  | Amount | Parts by weight | 0 | 100 | 50 | 50 | 50 |
| (B) Methacrylic resin 2 | Kind |  | — | — | — | — | — |
|  | Amount | Parts by weight | 0 | 0 | 0 | 0 | 0 |
| (C) Multilayer structure polymer | Kind |  | — | — | — | C-1 | C-3 |
|  | Amount | Parts by weight | 0 | 0 | 0 | 15 | 25 |
| (D) Reactive compound | Kind |  | D-1 | D-1 | D-1 | D-1 | D-1 |
|  | Amount | Parts by weight | 0.5 | 0.5 | 0.5 | 0.5 | 0.5 |
| Properties of methacrylic resins | Difference of Tg | ° C. | — | — | — | — | — |
|  | Difference of syndiotacticity | % | — | — | — | — | — |
| Syndiotacticity/isotacticity of methacrylic resins in resin composition |  |  | — | 8.1 | 8.1 | 8.1 | 8.1 |
| Heat resistance (Tg) | Half point glass transition temperature | ° C. | 61 | 117 | 72 | 72 | 71 |
|  | Extrapolated end point transition temperature | ° C. | 73 | 120 | 78 | 77 | 76 |
| Heat resistance | DTUL | ° C. | 56 | 95 | 69 | 68 | 62 |
| Transparency | Haze | % | 2 | 1 | 2 | 8 | 9 |
| Flowability | MFR | g/10 min | 10 | 1 | 3 | 2 | 1 |
| Impact resistance |  | J/m | 24 | 22 | 25 | 145 | 195 |
| Tensile strength |  | MPa | 71 | 79 | 79 | 65 | 52 |
| Dispersion state of multilayer structure polymer | Dispersed particle diameter | nm | — | — | — | 350 | 190 |
|  | l/m*1 |  | — | — | — | 0.4 | 0.6 |
| Hydrolysis resistance |  | % | 5 | 93 | 41 | 40 | 40 |

*1. Ratio of the number of agglomerated particles (l) to the number of non-agglomerated particles (m) of multilayer structure polymer
(A) Polylactic acid-based resin
(A-2) Poly-L-lactic acid resin (D isomer 1.2%, Mw 150,000)
(B) Methacrylic resins
(B-2) Methacrylic resin {"Parapet" HR-L produced by Kuraray, Mw 90,000, Tg 117° C., syndiotacticity 56%, MFR 2 g/10 min (230° C., 37.2 N)}
(C) Multilayer structure polymers respectively formed as particles each consisting of a core layer and one or more shell layers covering it
(C-1) Polymer produced in Production Example 1 (core . . . butyl acrylate/methyl methacrylate copolymer, shell . . . methyl acrylate/methyl methacrylate copolymer, refractive index 1.472, Tg of rubber layer −30° C.)
(C-3) "Paraface" ME-120 produced by Kuraray (core . . . acrylic polymer, shell . . . methyl methacrylate copolymer, refractive index 1.468, Tg of rubber layer −50° C.)
(D) Reactive compounds
(D-1) Glycidyl group-containing acrylic/styrene-based copolymer ("ARUFON" UG4040 produced by Toagosei, weight average molecular weight 10,000)

From the results of Tables 5 and 6, the following can be seen.

From the comparison between Examples 15 to 17 and Comparative Examples 13 to 15, it can be seen that a resin composition obtained by mixing a polylactic acid-based resin, methacrylic resins and a reactive compound is excellent in heat resistance, transparency and flowability. Further, from the comparison between Examples 18 to 23 and Comparative Examples 16 and 17, a resin composition further having a multilayer structure polymer mixed is excellent also in impact resistance. It can also be seen that above all, if a polymer with a weight average molecular weight of 1,000 to 300,000 and containing glycidyl group-containing vinyl units or a compound containing carbodiimide groups is used as the reactive compound, the resin composition is excellent in heat resistance, impact resistance and hydrolysis resistance.

Examples 24 to 28 and Comparative Examples 18 to 21

In Examples 24 to 27 and Comparative Examples 18 to 21, resin compositions and molded articles were obtained as described for Example 1, except that a polylactic acid-based resin, methacrylic resins, inorganic particles and/or a multilayer structure polymer and a reactive compound were mixed as shown in Tables 7 and 8. In Example 28, a polylactic acid-based resin, methacrylic resins and colloidal silica were mixed with stirring in 500 parts by weight of tetrahydrofuran for 3 hours, and a very excessive amount of ethanol was supplied. The obtained precipitate was dried at 70° C., to obtain a resin composition. The results of respective evaluations are shown in Tables 7 and 8.

TABLE 7

|  |  |  | Example |  |  |  |  |
|---|---|---|---|---|---|---|---|
|  |  |  | 24 | 25 | 26 | 27 | 28 |
| (A) Polylactic acid-based resin | Kind |  | A-2 | A-2 | A-2 | A-2 | A-2 |
|  | Amount | Parts by weight | 50 | 50 | 50 | 50 | 50 |
| (B) Methacrylic resin 1 | Kind |  | B-2 | B-2 | B-2 | B-2 | B-2 |
|  | Amount | Parts by weight | 25 | 25 | 25 | 25 | 25 |
| (B) Methacrylic resin 2 | Kind |  | B-3 | B-3 | B-3 | B-3 | B-3 |
|  | Amount | Parts by weight | 25 | 25 | 25 | 25 | 25 |
| (C) Multilayer structure polymer | Kind |  | — | C-1 | — | C-1 | — |
|  | Amount | Parts by weight | 0 | 15 | 0 | 15 | 0 |
| (D) Reactive compound | Kind |  | — | — | D-1 | D-1 | — |
|  | Amount | Parts by weight | 0.0 | 0.0 | 0.5 | 0.5 | 0.0 |
| (E) Inorganic particles | Kind |  | E-1 | E-1 | E-1 | E-1 | E-2 |
|  | Amount | Parts by weight | 3 | 3 | 3 | 3 | 15 |
| Properties of methacrylic resins | Difference of Tg | ° C. | 27 | 27 | 27 | 27 | 27 |
|  | Difference of syndiotacticity | % | 17 | 17 | 17 | 17 | 17 |
| Syndiotacticity/isotacticity of methacrylic resins in resin composition |  |  | 3.9 | 3.9 | 3.9 | 3.9 | 3.9 |
| Heat resistance (Tg) | Half point glass transition temperature | ° C. | 78 | 77 | 79 | 78 | 78 |
|  | Extrapolated end point transition temperature | ° C. | 94 | 91 | 100 | 99 | 94 |
| Heat resistance | DTUL | ° C. | 84 | 83 | 86 | 85 | 83 |
| Transparency | Haze | % | 4 | 9 | 2 | 9 | 7 |
| Flowability | MFR | g/10 min | 5 | 4 | 4 | 3 | 5 |
| Impact resistance |  | J/m | 23 | 75 | 27 | 145 | 22 |
| Tensile strength |  | MPa | 80 | 68 | 79 | 68 | 78 |
| Dispersion state of multilayer structure polymer | Dispersed particle diameter | nm | — | 350 | — | 350 | — |
|  | l/m*1 |  | — | 0.4 | — | 0.4 | — |
| Shape of inorganic particles | Length of minor axes | nm | 10 | 10 | 10 | 10 | 20 |
|  | Length of major axes | nm | 150 | 150 | 150 | 150 | 25 |
| Whether or not silicon is contained in inorganic particles |  |  | Contained | Contained | Contained | Contained | Contained |
| Hydrolysis resistance |  | % | 12 | 10 | 51 | 46 | 7 |

*1. Ratio of the number of agglomerated particles (l) to the number of non-agglomerated particles (m) of multilayer structure polymer
(A) Polylactic acid-based resin
(A-2) Poly-L-lactic acid resin (D isomer 1.2%, Mw 150,000)
(B) Methacrylic resins
(B-2) Methacrylic resin {"Parapet" HR-L produced by Kuraray, Mw 90,000, Tg 117° C., syndiotacticity 56%, MFR 2 g/10 min (230° C., 37.2 N)}
(B-3) Methacrylic resin {"Sumipex" LG35 produced by Sumitomo Chemical, Mw 100,000, Tg 90° C., syndiotacticity 39%, MFR 35 g/10 min (230° C., 37.2 N))}
(C) Multilayer structure polymers respectively formed as particles each consisting of a core layer and one or more shell layers covering it
(C-1) Polymer produced in Production Example 1 (core . . . butyl acrylate/methyl methacrylate copolymer, shell . . . methyl acrylate/methyl methacrylate copolymer, refractive index 1.472, Tg of rubber layer −30° C.)
(D) Reactive compounds
(D-1) Glycidyl group-containing acrylic/styrene-based copolymer ("ARUFON" UG4040 produced by Toagosei, weight average molecular weight 10,000)
(E) Inorganic particles
(E-1) Montmorillonite exchanged by 12-aminododecanoic acid hydrochloride (organically modified layered silicate) obtained in Production Example 3
(E-2) Colloidal silica ("OSCAL" produced by Catalysts & Chemicals)

TABLE 8

|  |  |  | Comparative Example |  |  |  |
|---|---|---|---|---|---|---|
|  |  |  | 18 | 19 | 20 | 21 |
| (A) Polylactic acid-based resin | Kind |  | A-2 | A-2 | A-2 | A-2 |
|  | Amount | Parts by weight | 50 | 50 | 50 | 50 |
| (B) Methacrylic resin 1 | Kind |  | B-2 | B-2 | B-2 | B-2 |
|  | Amount | Parts by weight | 50 | 50 | 50 | 50 |

TABLE 8-continued

|  |  |  | Comparative Example | | | |
|---|---|---|---|---|---|---|
|  |  |  | 18 | 19 | 20 | 21 |
| (B) Methacrylic resin 2 | Kind |  | — | — | — | — |
|  | Amount | Parts by weight | 0 | 0 | 0 | 0 |
| (C) Multilayer structure polymer | Kind |  | — | C-1 | — | C-1 |
|  | Amount | Parts by weight | 0 | 15 | 0 | 15 |
| (D) Reactive compound | Kind |  | — | — | D-1 | D-1 |
| Amount | Parts by weight |  | 0.0 | 0.0 | 0.5 | 0.5 |
| (E) Inorganic particles | Kind |  | E-1 | E-1 | E-1 | E-1 |
|  | Amount | Parts by weight | 3 | 3 | 3 | 3 |
| Properties of methacrylic resins | Difference of Tg | °C. | — | — | — | — |
|  | Difference of syndiotacticity | % | — | — | — | — |
| Syndiotacticity/isotacticity of methacrylic resins in resin composition |  |  | 8.1 | 8.1 | 8.1 | 8.1 |
| Heat resistance (Tg) | Half point glass transition temperature | °C. | 72 | 72 | 72 | 72 |
|  | Extrapolated end point transition temperature | °C. | 78 | 77 | 78 | 77 |
| Heat resistance | DTUL | °C. | 81 | 80 | 82 | 83 |
| Transparency | Haze | % | 4 | 10 | 5 | 10 |
| Flowability | MFR | g/10 min | 4 | 2 | 3 | 2 |
| Impact resistance |  | J/m | 24 | 65 | 25 | 145 |
| Tensile strength |  | MPa | 80 | 68 | 79 | 68 |
| Dispersion state of multilayer structure polymer | Dispersed particle diameter | nm | — | 350 | — | 350 |
|  | l/m*1 |  | — | 0.4 | — | 0.4 |
| Shape of inorganic particles | Length of minor axes | nm | 10 | 10 | 10 | 10 |
|  | Length of major axes | nm | 150 | 150 | 150 | 150 |
| Whether or not silicon is contained in inorganic particles |  |  | Contained | Contained | Contained | Contained |
| Hydrolysis resistance |  | % | 9 | 8 | 42 | 41 |

*1. Ratio of the number of agglomerated particles (l) to the number of non-agglomerated particles (m) of multilayer structure polymer
(A) Polylactic acid-based resin
(A-2) Poly-L-lactic acid resin (D isomer 1.2%, Mw 150,000)
(B) Methacrylic resins
(B-2) Methacrylic resin {"Parapet" HR-L produced by Kuraray, Mw 90,000, Tg 117° C., syndiotacticity 56%, MFR 2 g/10 min (230° C., 37.2 N)}
(C) Multilayer structure polymers respectively formed as particles each consisting of a core layer and one or more shell layers covering it
(C-1) Polymer produced in Production Example 1 (core . . . butyl acrylate/methyl methacrylate copolymer, shell . . . methyl acrylate/methyl methacrylate copolymer, refractive index 1.472, Tg of rubber layer −30° C.)
(D) Reactive compounds
(D-1) Glycidyl group-containing acrylic/styrene-based copolymer ("ARUFON" UG4040 produced by Toagosei, weight average molecular weight 10,000)
(E) Inorganic particles
(E-1) Montmorillonite exchanged by 12-aminododecanoic acid hydrochloride (organically modified layered silicate) obtained in Production Example 3

From the results of Tables 7 and 8, the following can be seen.

From the comparison between Examples 24 to 28 and Comparative Examples 18 to 21, it can be seen that a resin composition obtained by mixing a polylactic acid-based resin, methacrylic resins and silicon-containing inorganic particles with a particle size of 5 to 500 nm is excellent in heat resistance, transparency and flowability, and that a preferred resin composition is excellent also in impact resistance and hydrolysis resistance.

Examples 29 and 30

In Examples 29 and 30, resin compositions and molded articles were prepared as described for Example 1, except that a polylactic acid-based resin and methacrylic resins as shown in Table 9 were mixed, and their glass transition temperatures, hazes and MFRs were obtained.

In succession, each of the resin compositions was injection-molded to prepare a disc substrate with pits formed. The obtained disc substrate was vapor-deposited with an aluminum reflection film by sputtering, and the reflection film was further spin-coated with an ultraviolet setting resin (SD-1700 produced by Dainippon Ink and Chemicals), to form a protective film, for preparing a compact disc as a read only optical recording medium.

To measure the strength of the prepared optical recording medium, one semicircular portion of it was fixed by a vice, and the other semicircular portion was held by hand at its vertex and bent till the optical recording medium was broken. The angle at which the optical recording medium was broken was measured and judged in reference to the following criterion.

Double circle: 30 degrees or more
Single circle: 20 to 30 degrees
Triangle: 15 to 20 degrees
Cross: 15 degrees or less With regard to the reproduction characteristics of the prepared optical recording medium, a hot air dryer was used for treatment at 70° C. for 200 hours or treated in a thermohygrostat under conditions of temperature 50° C. and relative humidity 95% (95% RH) for 200 hours, and whether or not it allowed voice reproduction by a player was judged according to the following criterion. Further, the reproduction characteristics of a non-treated optical recording medium were also confirmed similarly.

Double circle: The optical recording medium allowed reproduction without any problem.
Single circle: The optical recording medium was slightly deformed but allowed reproduction.
Triangle: The optical recording medium caused some read errors and did not allow sufficient reproduction.
Cross: The optical recording medium did not allow reproduction at all.

The results are shown in Table 9.

TABLE 9

|  |  |  | Example | |
|---|---|---|---|---|
|  |  |  | 29 | 30 |
| (A) Polylactic acid-based resin | Kind | | A-2 | A-2 |
|  | Amount | Parts by weight | 50 | 30 |
| (B) Methacrylic resin 1 | Kind | | B-2 | B-2 |
|  | Amount | Parts by weight | 25 | 35 |
| (B) Methacrylic resin 2 | Kind | | B-3 | B-3 |
|  | Amount | Parts by weight | 25 | 35 |
| Properties of methacrylic resins | Difference of Tg | °C. | 27 | 27 |
|  | Difference of syndiotacticity | % | 17 | 17 |
| Syndiotacticity/isotacticity of methacrylic resins in resin composition | | | 3.9 | 3.9 |
| Heat resistance (Tg) | Half point glass transition temperature | °C. | 78 | 88 |
|  | Extrapolated end point transition temperature | °C. | 94 | 105 |
| Transparency | Haze | % | 2 | 2 |
| Flowability | MFR | g/10 min | 6 | 4 |
| Pencil hardness | | | HB | H |
| Strength | | | ◎ | ◎ |
| Reproduction characteristics | Not treated | | ◎ | ◎ |
|  | 70° C., 200 h | | ○ | ◎ |
|  | 50° C., 95% RH, 200 h | | ◎ | ◎ |

(A) Polylactic acid-based resin
(A-1) Poly-L-lactic acid resin (D isomer 1.2%, Mw 120,000)
(A-2) Poly-L-lactic acid resin (D isomer 1.2%, Mw 150,000)
(A-3) Poly-L-lactic acid resin (D isomer 1.2%, Mw 210,000)
(B) Methacrylic resins
(B-1) Methacrylic resin {"Sumipex" LG21 produced by Sumitomo Chemical, Mw 80,000, Tg 105° C., syndiotacticity 41%, MFR 21 g/10 min (230° C., 37.2 N)}
(B-2) Methacrylic resin {"Parapet" HR-L produced by Kuraray, Mw 90,000, Tg 117° C., syndiotacticity 56%, MFR 2 g/10 min (230° C., 37.2 N)}
(B-3) Methacrylic resin {"Sumipex" LG35 produced by Sumitomo Chemical, Mw 100,000, Tg 90° C., syndiotacticity 39%, MFR 35 g/10 min (230° C., 37.2 N)}

From the results of Table 9, the following can be seen.

From Examples 29 and 30, it can be seen that a resin composition obtained by mixing a polylactic acid-based resin and two methacrylic resins satisfying the condition of having a difference of 10° C. or more in glass transition temperature and/or the condition of having a difference of 3% or more in syndiotacticity is excellent in heat resistance, transparency and flowability, and that the optical recording medium using the resin composition as its substrate can be used without any problem.

INDUSTRIAL APPLICABILITY

The resin composition of this invention can be used in various applications such as electric and electronic parts, architectural members, automobile parts, various containers, daily-used articles, miscellaneous living goods and sanitary articles, since they are excellent in transparency, heat resistance and flowability.

The invention claimed is:
1. A resin composition comprising:
 (A) a polylactic acid resin; and
 (B) methacrylic resins,
 wherein the methacrylic resins (B) include two or more methacrylic resins satisfying at least one of the following conditions:
 (a) a difference in glass transition temperature of 10° C. or more
 (b) a difference in syndiotacticity of 3% or more, and
 wherein at least one of the methacrylic resins (B) satisfying condition (a) or (b) has a glass transition temperature of 110° C. or higher.

2. The resin composition, according to claim 1, wherein at least one of the methacrylic resins (B) satisfying condition (a) or (b) is a methacrylic resin with a weight average molecular weight of 50,000 to 450,000 and a syndiotacticity of 40% or more.

3. A molded article made of the resin composition as set forth in claim 2.

4. The resin composition, according to claim 2, wherein the two or more methacrylic resins (B) satisfy condition (a) and condition (b).

5. The resin composition, according to claim 1, further comprising (C) a multilayer structure polymer formed as particles each consisting of a core layer and at least one or more shell layers covering the core layer.

6. The resin composition, according to claim 5, wherein the multilayer structure particles (C) satisfy at least one of the following conditions:
 (c) having a refractive index of 1.45 to 1.50; and
 (d) containing a component with a glass transition temperature of 30° C. or lower.

7. A molded article made of the resin composition as set forth in claim 6.

8. The resin composition, according to claim 5, wherein the outermost shell layer of the multilayer structure particles (C) is formed of a polymer containing units selected from the group consisting of methyl methacrylate units, methyl acrylate units and mixtures thereof.

9. A molded article made of the resin composition as set forth in claim 8.

10. The resin composition, according to claim 5, wherein the multilayer structure particles (C) have a dispersed particle size of 1 to 1,000 nm.

11. A molded article made of the resin composition as set forth in claim 10.

12. A molded article made of the resin composition as set forth in claim 5.

13. The resin composition, according to claim 5, wherein the two or more methacrylic resins (B) satisfy condition (a) and condition (b).

14. The resin composition, according to claim 5, further comprising a reactive compound (D) which is a polymer having a weight average molecular weight of 1,000 to 300,000 and containing glycidyl group-containing vinyl units.

15. The resin composition, according to claim 14, further comprising (E) inorganic particles containing silicon and having minor and major axes, wherein the length of the minor axes of the inorganic particles is 1 to 300 nm, and the length of the major axes is 1 to 1,000 nm.

16. The resin composition, according to claim 1, further comprising (D) a reactive compound containing functional groups selected from the group consisting of glycidyl groups, acid anhydride groups, carbodiimide groups, oxazoline groups and mixtures thereof.

17. The resin composition, according to claim 16, wherein the reactive compound (D) is a polymer having a weight average molecular weight of 1,000 to 300,000 and containing glycidyl group-containing vinyl units.

18. A molded article made of the resin composition as set forth in claim 16.

19. The resin composition, according to claim 1, further comprising (E) inorganic particles having minor and major axes, wherein the length of the minor axes of the inorganic particles is 1 to 300 nm, and the length of the major axes is 1 to 1,000 nm.

20. The resin composition, according to claim 19, wherein the inorganic particles (E) contain silicon.

21. A molded article made of the resin composition as set forth in claim 1.

22. The resin composition, according to claim 1, wherein the two or more methacrylic resins (B) satisfy condition (a) and condition (b).

23. The resin composition according to claim 1, wherein the methacrylic resins (B) contain 70% or more of methyl methacrylate units.

* * * * *